US008706565B2

(12) United States Patent
Rollins et al.

(10) Patent No.: US 8,706,565 B2
(45) Date of Patent: Apr. 22, 2014

(54) PRE-FILLING ORDER FORMS FOR TRANSACTIONS OVER A COMMUNICATIONS NETWORK

(75) Inventors: Eugene J. Rollins, Sunnyvale, CA (US); Sailendra Padala, Sunnyvale, CA (US); Norbert Hendrikse, Berkeley, CA (US)

(73) Assignee: Risible Enterprise LLC, Dover, DE (US)

( * ) Notice: Subject to any disclaimer, the term of this patent is extended or adjusted under 35 U.S.C. 154(b) by 1014 days.

(21) Appl. No.: 12/106,584

(22) Filed: Apr. 21, 2008

(65) Prior Publication Data

US 2008/0263144 A1 Oct. 23, 2008

Related U.S. Application Data

(63) Continuation of application No. 09/747,651, filed on Dec. 22, 2000, now Pat. No. 7,363,248.

(51) Int. Cl.
*G06Q 30/00* (2012.01)

(52) U.S. Cl.
USPC ..... 705/26.41; 705/26.1; 705/26.4; 705/26.8; 705/26.7; 709/203

(58) Field of Classification Search
USPC ............... 705/26.1, 26.7, 26, 27, 26.4, 26.41, 705/26.8, 27.1; 709/203
See application file for complete search history.

(56) References Cited

U.S. PATENT DOCUMENTS

| | | | |
|---|---|---|---|
| 5,640,577 A | 6/1997 | Scharmer | 395/768 |
| 5,712,979 A | 1/1998 | Graber et al. | 395/200.11 |
| 5,764,910 A | 6/1998 | Shachar | 395/200.53 |
| 5,794,207 A | 8/1998 | Walker et al. | 705/23 |
| 5,794,259 A | 8/1998 | Kikinis | 707/507 |
| 5,890,138 A | 3/1999 | Godin et al. | 705/26 |
| 5,915,022 A | 6/1999 | Robinson et al. | 380/24 |

(Continued)

FOREIGN PATENT DOCUMENTS

| | | |
|---|---|---|
| EP | 0 847 179 A2 | 6/1998 |
| WO | WO 97/38389 | 10/1997 |

(Continued)

OTHER PUBLICATIONS

Barrett et al., Intermediaries: New Places for Producing and Manipulating Web Content, *Computer Networks and ISDN Systems*, vol. 30, Apr. 1, 1998, pp. 509-518.

(Continued)

*Primary Examiner* — Yogesh C Garg
(74) *Attorney, Agent, or Firm* — Stolowitz Ford Cowger LLP

(57) ABSTRACT

Communications between participants over a communications link are proxied by an intermediary, such as an Integrated Order Mechanism (IOM). Participants interact with each other through the IOM. The IOM may be transparent to the participants such that they are not aware that the IOM is involved in processing communications. For example, in the context of a transaction by a customer making a purchase from a merchant over the Internet, the IOM facilitates the processing of transactions by processing requests from both the customer and the merchant. Neither the customer nor the merchant may be aware that the transactions are being handled by the IOM. Order forms may be pre-filled for the transactions. For example, the IOM may obtain customer information from a database and use the customer information to complete the customer fields on a merchant web page containing an order form.

24 Claims, 12 Drawing Sheets

(56) References Cited

U.S. PATENT DOCUMENTS

| | | | |
|---|---|---|---|
| 5,956,699 A | 9/1999 | Wong et al. | 705/39 |
| 5,960,411 A | 9/1999 | Hartman et al. | 705/26 |
| 5,963,915 A * | 10/1999 | Kirsch | 705/26.8 |
| 5,974,207 A | 10/1999 | Aksyuk et al. | 385/24 |
| 5,991,740 A | 11/1999 | Messer | 705/27 |
| 6,006,197 A | 12/1999 | d'Eon et al. | 705/10 |
| 6,016,504 A | 1/2000 | Arnold et al. | 709/200 |
| 6,029,141 A | 2/2000 | Bezos et al. | 705/27 |
| 6,035,281 A | 3/2000 | Crosskey et al. | 705/14 |
| 6,125,352 A | 9/2000 | Franklin et al. | 705/26 |
| 6,157,917 A | 12/2000 | Barber | 705/26 |
| 6,199,079 B1 | 3/2001 | Gupta et al. | 707/507 |
| 6,237,031 B1 | 5/2001 | Knauerhase et al. | 709/221 |
| 6,253,228 B1 | 6/2001 | Ferris et al. | 709/203 |
| 6,285,776 B1 | 9/2001 | Rhoads | 382/100 |
| 6,317,761 B1 * | 11/2001 | Landsman et al. | 715/205 |
| 6,321,256 B1 | 11/2001 | Himmel et al. | 709/218 |
| 6,327,574 B1 | 12/2001 | Kramer et al. | 705/14 |
| 6,490,601 B1 | 12/2002 | Markus et al. | 707/507 |
| 6,499,042 B1 | 12/2002 | Markus | 707/507 |
| 6,505,230 B1 | 1/2003 | Mohan et al. | 709/202 |
| 6,532,492 B1 | 3/2003 | Presler-Marshall | 709/223 |
| 6,535,880 B1 | 3/2003 | Musgrove et al. | 707/10 |
| 6,615,247 B1 * | 9/2003 | Murphy | 709/217 |
| 6,675,153 B1 | 1/2004 | Cook et al. | 705/74 |
| 6,826,594 B1 | 11/2004 | Pettersen | 709/203 |
| 6,836,801 B1 | 12/2004 | Parrish et al. | |
| 6,981,028 B1 | 12/2005 | Rawat et al. | 709/217 |
| 7,006,993 B1 | 2/2006 | Cheong et al. | 705/38 |
| 7,349,867 B2 | 3/2008 | Rollins et al. | 705/26 |
| 7,363,248 B2 | 4/2008 | Rollins et al. | 705/26 |
| 7,415,429 B2 | 8/2008 | Rollins et al. | 705/27 |
| 7,565,308 B1 | 7/2009 | Bollay | 705/26 |
| 2002/0010651 A1 * | 1/2002 | Cohn et al. | 705/26 |
| 2002/0023108 A1 | 2/2002 | Daswani et al. | 707/507 |
| 2002/0032579 A1 * | 3/2002 | Harpale | 705/1 |
| 2002/0052931 A1 * | 5/2002 | Peiffer et al. | 709/218 |
| 2002/0073043 A1 | 6/2002 | Herman et al. | 705/64 |
| 2002/0099812 A1 | 7/2002 | Davis et al. | 709/224 |
| 2003/0140312 A1 | 7/2003 | Mohan et al. | 715/513 |
| 2008/0270882 A1 | 10/2008 | Rollins et al. | |
| 2009/0030807 A1 | 1/2009 | Rollins et al. | |
| 2009/0228376 A1 | 9/2009 | Rollins et al. | |
| 2010/0037130 A1 * | 2/2010 | Jakubowski | 715/235 |

FOREIGN PATENT DOCUMENTS

| | | |
|---|---|---|
| WO | WO 99/46701 | 9/1999 |
| WO | WO 99/66436 | 12/1999 |
| WO | WO 00/31657 | 6/2000 |
| WO | WO 00/42540 | 7/2000 |
| WO | WO 00/54203 | 9/2000 |
| WO | 02052449 | 7/2002 |
| WO | 02056231 | 7/2002 |
| WO | 02/089012 | 11/2002 |

OTHER PUBLICATIONS

Marshall Brain, "How Internet Cookies Work", howstuffworks.com, printed Apr. 21, 2003, copyright 1998-2003, 2 pages.

Brooks et al., "Application-Specific Proxy Servers as HTTP Stream Transducers", *Internet Citation*, Dec. 1, 1995, pp. 1-9, XP002081461.

Ward, Mark, "Pixel-High Privacy Spy", *BBC News Online: Sci/Tech*, [Online], Retrieved from the Internet, <http://news.bbc.co.uk/2/low/science/nature/842624.stm>, Jul. 20, 2000, 3 pages.

Smith, Richard M., "The Web Bug FAQ", [Online], Retrieved from the Internet, http://www.eff.org/Privacy/Marketino/web_bug.html, Nov. 11, 1999, 4 pages.

Bush, Vannevar, "As We May Think", *The Atlantic Online*, Jul. 1945, vol. 176, No. 1, pp. 101-108 (14 pages).

Bush, Vannevar, "As We May Think", *The Atlantic Monthly*, Jul. 1945, vol. 176, No. 1, pp. 101-108 (5 pages).

Doherty, Paul, et al., "Web-Related Applications Power Productivity and Partnering", *Building Design & Construction*, Oct. 1996, vol. 37, Issue 10, pp. 63-68 (5 pages).

European Patent Application No. 01273892.8, Communication Pursuant to Article 96(2) EPC mailed from the European Patent Office on Feb. 10, 2006, 5 pages.

European Patent Application No. 01273892.8, Response filed with the European Patent Office on Jun. 7, 2006, 25 pages.

European Patent Application No. 01273892.8, Communication Pursuant to Article 96(2) EPC mailed from the European Patent Office on Jul. 11, 2007, 4 pages.

European Patent Application No. 01273892.8, Response filed with the European Patent Office on Dec. 12, 2007, 3 pages.

European Patent Application No. 01273892.8, Summons to Attend Oral Proceedings Pursuant to Rule 115(1) EPC mailed from the European Patent Office on Apr. 9, 2009, 4 pages.

European Patent Application No. 01273892.8, Result of Consultation and Brief Communication mailed from the European Patent Office on May 4, 2009, 3 pages.

European Patent Application No. 01273892.8, Written Submissions filed with the European Patent Office on Dec. 14, 2009, 20 pages.

European Patent Application No. 01273892.8, Summons to Attend Oral Proceedings Pursuant to Rule 115(1) EPC mailed from the European Patent Office on Feb. 8, 2010, 5 pages.

European Patent Application No. 01273892.8, Written Submissions filed with the European Patent Office on Mar. 25, 2010, 19 pages.

European Patent Application No. 01273892.8, Brief Communication mailed from the European Patent Office on Apr. 15, 2010, 4 pages.

European Patent Application No. 01273892.8, Further Written Submissions filed with the European Patent Office on Apr. 23, 2010, 12 pages.

European Patent Application No. 01273892.8, Response filed with the European Patent Office on Apr. 26, 2010, 10 pages.

European Patent Application No. 01273892.8, Result of Consultation and Provision of the Minutes in Accordance with Rule 124(4) EPC mailed from the European Patent Office on May 7, 2010, 7 pages.

European Patent Application No. 01273892.8, Communication Under Rule 71(3) EPC mailed from the European Patent Office on May 12, 2010, 63 pages.

European Patent Application No. 01273892.8, Response to the Communication Under Rule 71(3) EPC filed with the European Patent Office on Sep. 9, 2010, 19 pages.

European Patent Application No. 01273892.8, Decision to Grant a European Patent Pursuant to Article 97(1) EPC mailed from the European Patent Office on Sep. 23, 2010, 1 page.

Stolowitz Ford Cowger LLP, Related Case Listing; Jul. 5, 2013, 2 pages.

European Patent Office-ISA; international Search Report and International Preliminary Examination Report PCT/US01/49096, WO02/052449; Jun. 16, 2003; 7 Pages.

European Patent Office-ISA; International Search Report and International Preliminary Examination Report PCT/US01/49097, WO02/056231; May 13, 2003; 13 Pages.

European Patent Office-ISA; International Search Report and International Preliminary Examination Report, PCT/US01/51634, WO02/08912; Jun. 13, 2003; 11 Pages.

* cited by examiner

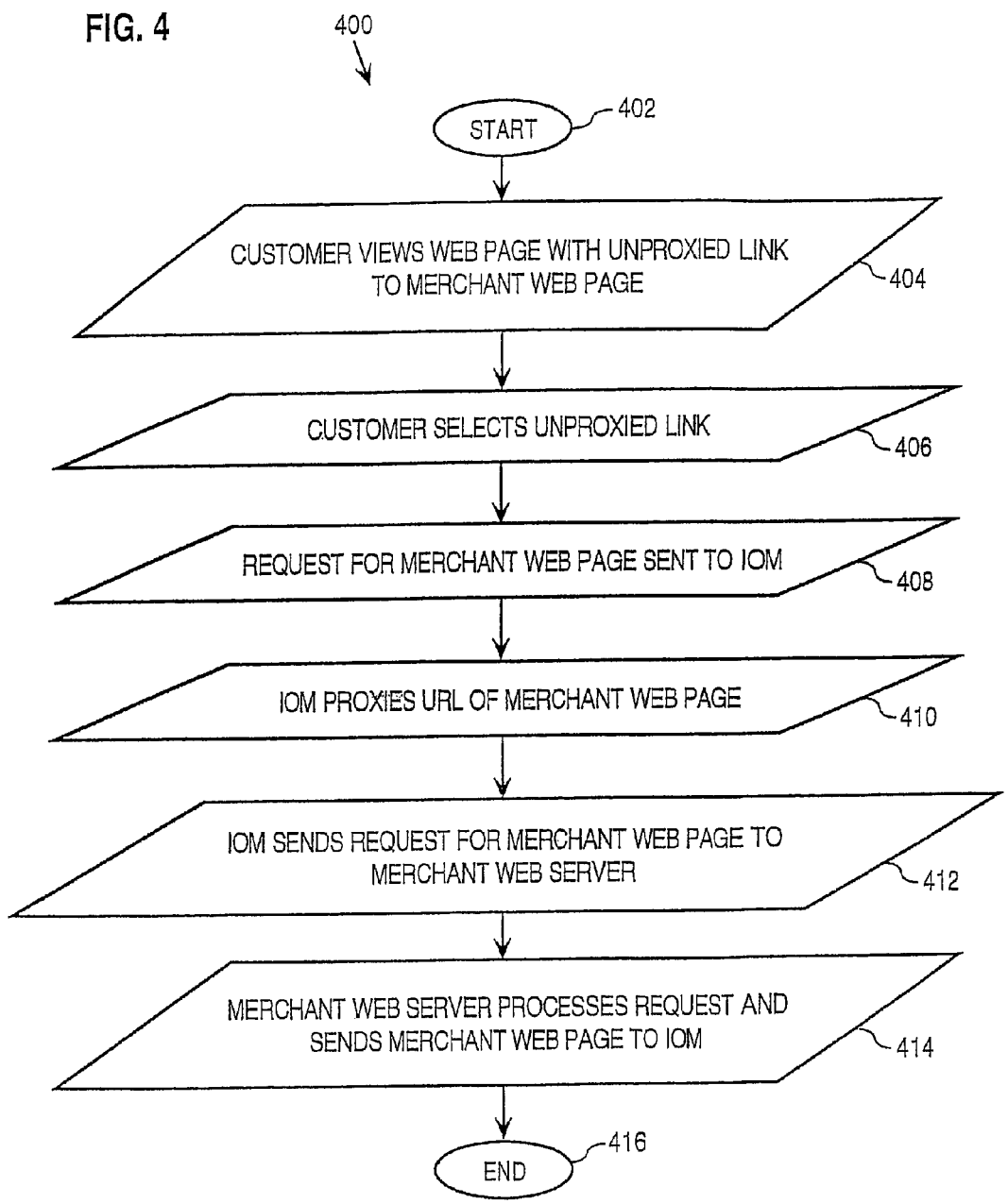

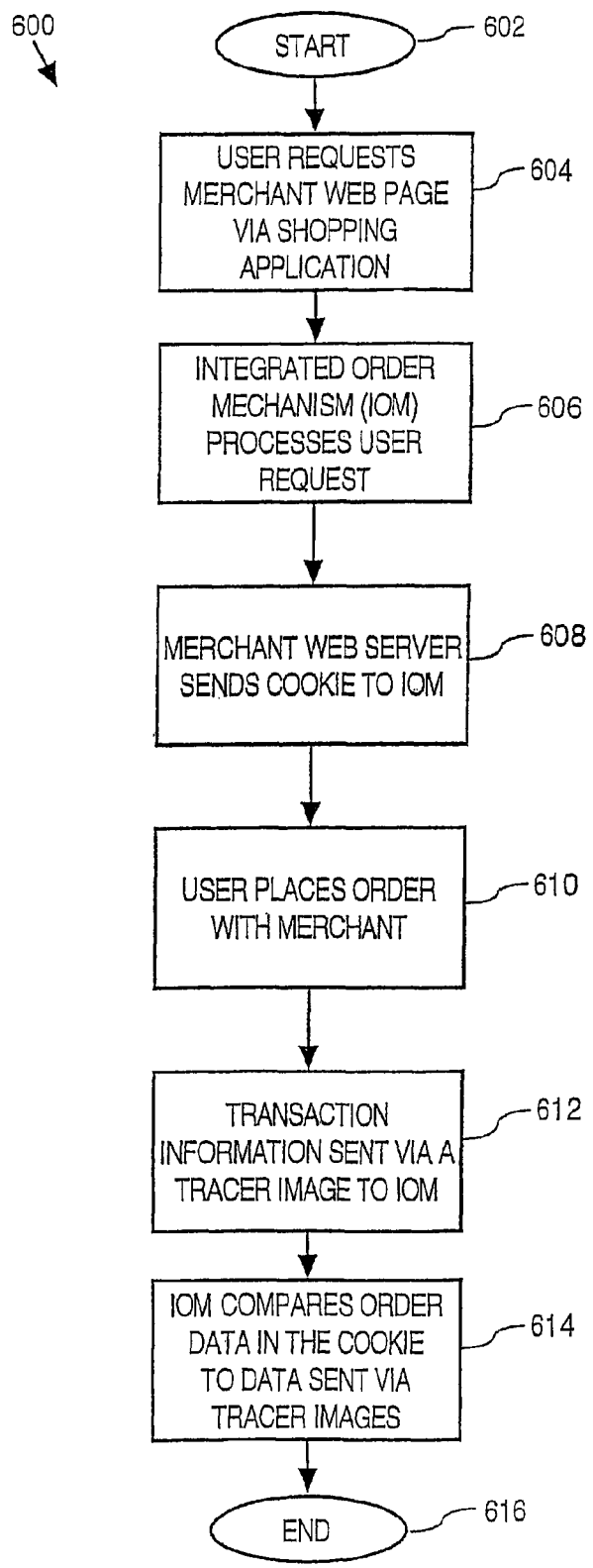

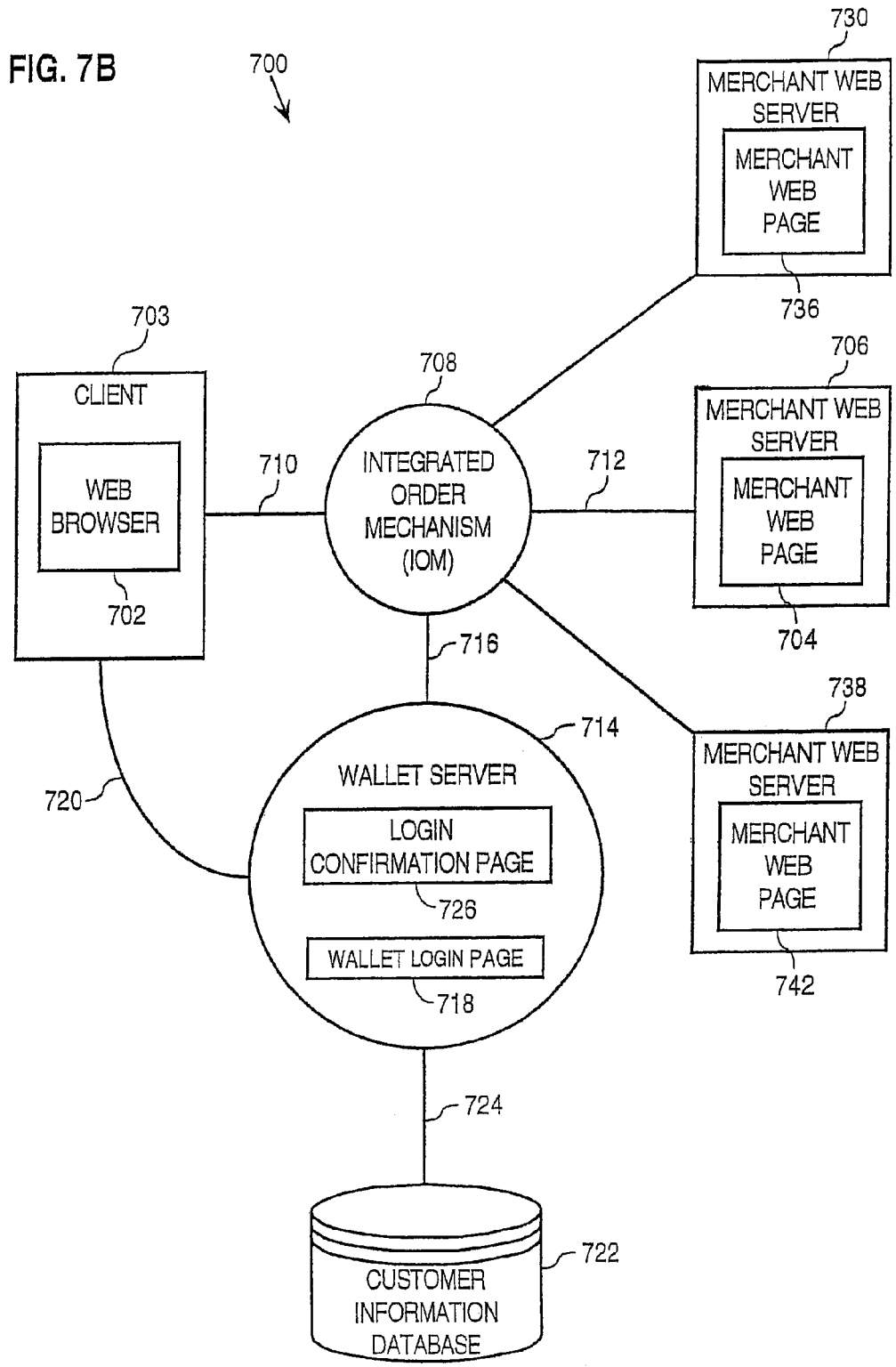

PRE-FILLING ORDER FORMS FOR TRANSACTIONS OVER A COMMUNICATIONS NETWORK

RELATED APPLICATIONS

This application is a continuation of U.S. patent application Ser. No. 09/747,651, filed Dec. 22, 2000, which issued as U.S. Pat. No. 7,363,248 B2 on Apr. 22, 2008, and which is related to the following commonly-assigned U.S. patent applications, the contents of all of which in their entirety are hereby incorporated by reference herein:

U.S. patent application Ser. No. 09/747,666 entitled "TRACKING TRANSACTIONS BY USING ADDRESSES IN A COMMUNICATIONS NETWORK," filed on Dec. 22, 2000 by Eugene J. Rollins, Sailendra Padala, Norbert Hendrikse, Paul Gauthier, and Michael Tso, now U.S. Pat. No. 7,349,867 B2 (issued Mar. 25, 2008); and U.S. patent application Ser. No. 09/747,656 entitled "PROVIDING NAVIGATION OBJECTS FOR COMMUNICATIONS OVER A NETWORK," filed on Dec. 22, 2000 by Eugene J. Rollins, Sailendra Padala, and Norbert Hendrikse, now U.S. Pat. No. 7,415,429 B2 (issued Aug. 19, 2008).

FIELD OF THE INVENTION

The present invention relates generally to processing transactions over a communications link, and relates more specifically to an approach for pre-filling order forms for transactions over a communications network.

BACKGROUND OF THE INVENTION

Contemporary communications networks, particularly the worldwide packet data communications network known as the "Internet," give consumers an unprecedented ability to purchase products and services from a myriad of locations around the world. Consumers can use the Internet to visit "electronic stores" to obtain information about products and services and make purchases. In response to the proliferation of electronic stores on the Internet, web sites known as "shopping applications" or "portals" have been developed to provide a single point of access to a large number of electronic stores, making comparison shopping much easier. Shopping applications and portals typically allow a customer to enter a search request and be presented with a list of electronic stores that offer the requested product or service. The customer can select a particular store and be automatically connected to the store's website.

FIG. 1 is block diagram 100 that depicts example web pages viewed by a customer when purchasing a product or service over the Internet using a conventional shopping application. As used herein, the terms "web page" and "page" are use analogously to refer generally to an electronic document that can be displayed using a web browser.

A customer begins by using a web browser to access a product search page 102 of a shopping application (not illustrated). The customer may either enter the Uniform Resource Locator (URL) of product search page 102 directly into the web browser or "navigate" to product search page 102 by "following", i.e., selecting, a link from another web page.

Product search page 102 includes a search terms object 104 that the customer uses to enter terms that describe the desired product or service. The customer then initiates a search by selecting a search button object 106. This causes the search terms to be sent to the shopping application for processing.

Once the shopping application has processed the search terms specified by the customer, search results are displayed to the customer on a shopping results page 108. Shopping results pages generally identify merchants that offer the product or service specified by the search terms and sometimes include other information such as price. In the present example, shopping results page 108 includes product information for two merchants. Objects 110 and 112 include descriptions of first and second products offered by first and second merchants, respectively. Objects 114 and 116 identify the names of the first and second merchants, respectively. Objects 118 and 120 provide price information for the first and second products offered by the first and second merchants, respectively.

After reviewing shopping results page 108, the customer may take several actions. For example, customer may "return" to product search page 102 by selecting a return button object 122. As used herein, the term "return" refers to re-displaying a previously displayed web page. In the present example, return button object 122 includes the URL of product search page 102. Thus, selecting return button object 122 causes product search page 102 to be retrieved and re-displayed on the customer's browser. Note that product search page 102 may be retrieved either from the server where the shopping application resides or from the client where the customer's web browser is executing.

The customer initiates a purchase of the first product listed on shopping results page 108 by selecting a buy button object 124 associated with the first product offered by the first merchant. Similarly, the customer initiates a purchase of the second product from the second merchant by clicking on a buy button object 126. Other objects displayed on shopping results page 108, such as objects 110 and 112, may also allow a customer to initiate a product purchase.

Initiating a product purchase causes merchant product page 128 to be retrieved and displayed on the customer's browser. Merchant product page 128 is typically provided by the merchant's web site, not by the shopping application that provides product search page 102 and shopping results page 108.

In the present example, merchant product page 128 includes a product picture object 130 and a product information object 132 that provide information about the particular product offered by the merchant. To purchase a product, the customer selects an "add product to shopping cart button" object 134, which selects the particular product for purchase. The customer then selects a checkout button object 136 to complete the transaction, which conventionally requires that the customer enter address and billing information. Merchant product page 128 may also contain other links (not illustrated) to information about the merchant, such as shipping options or policies relating to purchases and returns.

One problem with conventional approaches for processing orders over the Internet, such as just described, is the difficulty or inability for customers to return easily to a shopping application after having been transferred from the application to a merchant web site. The ability of a web site to remain the target of the user's input once the user has visited the site is referred to as "stickiness," so the problem of losing a user in the transition from the shopping results page to the merchant product page is referred to as a lack of "stickiness."

Ordinarily, a customer uses the "back" button on their browser to reload previous web pages until the desired shopping application web page is loaded. This may require that a customer select the back button many times, depending upon how many web pages were viewed to get to the merchant web page. Furthermore, customers cannot use the back button to return to the shopping application web page when so-called redirect URLs are used to cause a web browser to load a different web page than the requested web page. In these situations, the "chain" of links used to access the merchant web page is "broken" and selecting the back button will not return the customer to the shopping application. Hence, customers may be unable to return to a shopping application from a merchant site, or may only be capable of doing so via the repeated use of a web browser's back button. Either of these situations can deter customers from returning to a merchant web site.

Another problem with conventional approaches for processing orders over the Internet relates to the payment of commissions to shopping applications and portals. It is now common for shopping applications and portals to be compensated for directing or "driving" customers to particular merchants. This necessitates tracking the origination of transactions to particular shopping applications or portals, which can be difficult. The nature of the hyperlink structure of the World Wide Web is such that once a customer traverses from a first web page to a second web page, the provider of the first web page may no longer be in contact with the customer and not know the "location" of the customer. For example, in the context of a customer who uses a shopping application to access a merchant, once the customer leaves the shopping application and arrives at the merchant web site, the customer may navigate through various merchant web pages exploring the products offered for sale. Once the user is at the merchant's web site, the shopping application does not know what, if anything, the customer buys at the merchant web site. In this situation, the shopping application does not know whether it is entitled to a commission for directing the customer to that particular merchant.

One solution to this problem is for merchants to track how customers reached their web site by adding to their web sites the ability to track and record how each customer navigated to their web site. Although this approach allows merchants to definitively track the origination of transactions, there are two significant drawbacks. First, this solution requires that merchants customize their web sites, which is costly and time consuming for the merchants. Second, this solution requires that shopping application providers trust that merchants will properly account for the origination of transactions.

Another solution to this problem involves the use of what are known as "tracer images." This generally involves merchants providing to all interested shopping applications data that uniquely identifies particular transactions and then relying upon shopping applications to claim origination of certain transactions. FIG. 2 is a block diagram 200 that illustrates example web pages and a conventional approach for using tracer images to track transactions.

A customer uses a web browser (not illustrated) to navigate to a merchant product page 202, typically by following a link from a shopping application or portal. The customer then navigates to a merchant order page 204 to make a purchase from the merchant associated with merchant product page 202. At merchant order page 204, the customer specifies the products that are desired along with other information required to complete the order, such as customer identification, customer and shipping addresses and payment information. After placing the order, the merchant web site generates an order confirmation page 206 that summarizes the order. The merchant web site may also record information about the purchase transaction to be used later to confirm commission charges from the shopping application.

Order confirmation page 206 includes a tracer image 208 that identifies attributes of the completed transaction. Tracer images may be implemented in several ways. For example, tracer images may be represented by a single dot or pixel so that customers do not notice them. They are embedded on the Hyper-Text Markup Language (HTML) order confirmation page on a merchant site as an image (IMO) tag, where the source (SRC) attribute of the image consists of the URL of an order confirmation tracking server hosted by the shopping application. This tracking URL also includes attributes about the transaction that was just completed by the customer. Example attributes include, without limitation, a merchant identification number, an order identification number, a total amount of merchandise purchased or currency denomination.

Order confirmation page 206 is sent to the customer's browser for display. The customer's web browser interprets image links contained in an order confirmation page 206 to retrieve and display the appropriate image. For tracer image 208, the information associated with tracer image 208 is requested from the location indicated in the SRC attribute (i.e., the specified third party) and provided to the web browser. The information about the transaction is sent to the third party from the browser when the browser requests tracer image 208 from the third party. The third party may be a shopping application provider or another company that provides a commission tracking service.

Tracer images may be used to send transaction information to all shopping applications for all transactions. This approach leaves to shopping applications the determination of where transactions originated, which is undesirable to many merchants since they must trust the shopping applications to correctly assign commissions. Alternatively, tracer images may be sent to shopping applications on a transaction-by-transaction basis. This approaches leaves the tracking of commissions in the hands of merchants, which is undesirable to many shopping applications since they must trust the merchants to correctly assign commissions. In either situation, a considerable burden is placed on merchants to implement tracer image technology into their web site infrastructure, which is costly and time consuming.

Yet another problem with conventional approaches for processing orders over the Internet relates to completing order forms required by merchants to process a transaction. Customers are typically required to complete an order form to complete transactions. Order forms provide merchants with various types of information, such as shipping and billing information. This same information is often needed, and must be separately provided, for every online purchase that a customer makes.

One solution is for merchants to maintain this information for their customers so that returning customers only have to confirm or change the information. Another solution is for the information to be maintained by a third party and used by merchants to complete transactions. Even if a third party service is used, the customer will have to access that information for each merchant from whom the customer makes a purchase. Therefore, a customer may have to spend considerable time providing or accessing the same basic information over and over for each purchase even if they are not from different merchants.

Based on the foregoing, an approach for processing orders over the Internet that does not suffer from limitations of prior approaches is highly desirable.

There is a particular need for an approach for processing orders over the Internet that provides stickiness by allowing customers to easily and reliably return to a shopping application from a merchant web site.

There is a further need for an approach for processing orders over the Internet that allows a shopping application to collect commissions without requiring merchants to modify their web sites.

There is a further need for an approach for processing orders over the Internet that allows a merchant to determine how customers traversed to their web sites and that allow a shopping application to collect detailed information about transactions between customers and merchants.

There is yet a further need for an approach for processing orders over the Internet that eliminates the need for a customer to repeatedly enter the same information for different transactions or to repeatedly access such stored information.

SUMMARY OF THE INVENTION

Techniques are provided for using an intermediary to facilitate communications in a communications network. According to one aspect, requests for electronic documents are processed to include user information. In response to a request from a user for an electronic document, both the electronic document and user information are retrieved. An updated electronic document is generated that includes at least part of the user information, and the updated electronic document is provided to the user in response to the request.

According to other aspects, validation data may be received from the user, and the validation data may be validated. Information associated with the user may be stored such that the information may be used by other electronic documents. The information may be stored with the user via an Internet cookie, and the information may be stored in an encrypted format. The electronic document may be a web page, and the updated electronic document may be generated by an integrated order mechanism. The information associated with the user may be retrieved using a tracer image, and the information may be retrieved via a post from a server.

According to yet other aspects, the request from the user may be received at an intermediary and the electronic document may be stored on a server. The electronic document is retrieved by sending a new request from the intermediary to the server and receiving the electronic document in response. The information may be retrieved from a wallet server, and the information may be retrieved from an encrypted wallet cookie.

According to yet other aspects, the electronic document may contain data fields, and the updated electronic document is generated by updating the data fields based on information associated with the user. Generating the updated electronic document may also include determining whether the variables in the electronic document contain valid user data, and if not, revising the electronic document by substituting data values from the user information for the corresponding variables. If the variables do not correspond to the data values in the user information, the context in which the variables is used in the electronic document is examined. Data values may be identified by determining which data values conform to the content in which the variables are used. The data values thus identified are substituted for the appropriate variables.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a flow diagram that depicts an approach for processing transactions over a communications link using an integrated order mechanism as an intermediary according to an embodiment of the invention;

FIG. 6 is a flow diagram that illustrates an approach for tracking transactions using cookies and tracer images according to an embodiment of the invention;

FIG. 7B is a block diagram of an architecture for processing transactions between a client and multiple merchants according to an embodiment of the invention;

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Various aspects of the invention are described hereinafter in the following sections: (1) functional overview; (2) creating "stickiness" via transaction proxying; (3) tracking transactions; (4) order form pre-filling; (5) fail-over applications; (6) multiple vendors; (7) multiple communication protocols; and (8) implementation mechanisms.

1. Functional Overview

Transactions between participants are processed over a communications link using an intermediary referred to herein as an Integrated Order Mechanism (IOM). Transaction participants interact with each other through the IOM. The use of an intermediary between participants may be referred to as "proxying." For example, the IOM may be said to be "proxying the transaction" between the participants. The IOM may be implemented in a manner such that the existence of the IOM is transparent to the participants.

The "participants" of a transaction are typically two entities engaged in a particular type of communication or interaction, such as a customer purchasing a product from a merchant. While the embodiments discussed herein may be described in such commercial terms, neither the participants nor the transactions are limited to the commercial context, nor are the embodiments limited to interactions between two parties. For example, non-commercial interactions or exchanges among multiple private individuals, organizations, or other entities may be proxied via the same approaches described herein.

Processing transactions using an IOM as an intermediary avoids many of the problems appurtenant to conventional transaction processing. For example, in the context of the Internet, the use of an IOM provides stickiness so that customers may return easily to a shopping application from a merchant web site. The use of an IOM also allows transactions to be tracked so that commissions may be paid to shopping applications. In addition, processing transactions using an IOM facilitates pre-filling of merchant order forms with customer information. Other benefits provided by processing transactions using an IOM will be apparent from the description hereinafter.

Figure 3:
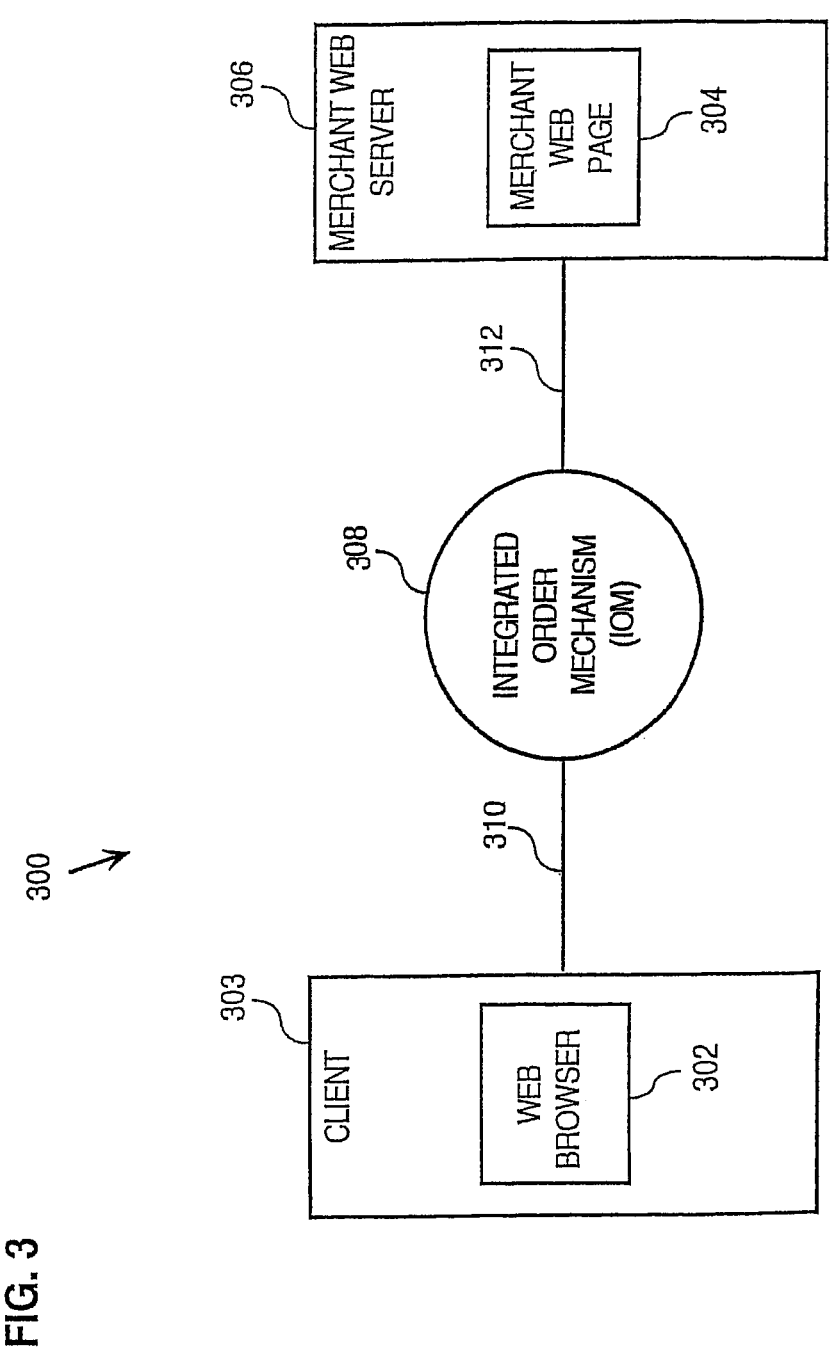
FIG. 3 is a block diagram that depicts an arrangement for processing transactions over a communications link using an integrated order mechanism as an intermediary according to an embodiment of the invention.

FIG. 3 is a block diagram 300 that depicts an arrangement for processing transactions over a communications link using an IOM according to an embodiment of the invention. For purposes of explanation, the approach is illustrated and described in the context of a customer purchasing goods or services from a merchant over the Internet, i.e., a customer/merchant transaction. It should be understood, however, that the invention is not limited to this context and is applicable to processing any type of transaction involving any number of participants over any type of communications link.

In the present example, a customer uses a web browser 302, executing on a client 303, to request a merchant web page 304 that resides on a merchant web server 306. In conventional transaction processing arrangements, merchant web page 304 is provided directly to web browser 302 and displayed by web browser 302 for the customer. The customer interacts with web browser 302 to cause various operations to be performed. For example, a customer might select an object (not illustrated) on merchant web page 304 to request information about a particular product or service offered by the merchant. In conventional transaction processing arrangements, the information, e.g., a web page, is provided directly from merchant web server 306 to web browser 302 and displayed for the customer.

In the present embodiment, an IOM 308 acts as an intermediary between web browser 302 and merchant web server 306. Data that would conventionally be exchanged directly between web browser 302 and merchant web server 306 is instead marshaled, and in some situations modified and/or operated on, by IOM 308 dynamically in response to requests by web browser 302 and merchant web server 306. More specifically, requests by web browser 302 are sent to IOM 308 over a communications link 310. The requests are operated on or otherwise modified by IOM 308, and forwarded to merchant web server 306 via a communications link 312. Similarly, data that is conventionally provided directly from merchant web server 306 to web browser 302 is instead provided to IOM 308 over communications link 312. IOM 308 modifies and/or operates on the data and then provides the modified data to web browser 302 over communications link 310. Thus, from the perspective of the customer (and web browser 302), IOM 308 acts like a merchant. Similarly, from the perspective of the merchant (and merchant web server 706), IOM 308 acts like a customer.

Unlike traditional web page proxying where only the headers of web pages are examined and not the content (body), IOM 308 may transform the content of web pages in a dynamic fashion such that the transformations are made in response to requests for the web pages. Example operations performed by IOM 308 include selectively proxying links on web pages, proxying cookies, proxying JavaScript and Java applets and providing additional objects on a proxied web page, such as a link in the form of a navigation object to allow a customer to return from a merchant web page to a shopping application. Each of these example operations is described in more detail hereinafter.

As used herein in the context of electronic documents such as web pages, the term "link" refers to a reference from one electronic document to another electronic document. For example, in the context of the Internet, a link from web page A to web page B means that web page A includes, or contains, a reference to web page B.

As used herein, the term "communications link" refers to any mechanism or medium that may provide for the transmission of data. Examples of a communications links include, without limitation, network connections, wires, fiber-optic links and wireless communications links. For purposes of explanation, IOM 308 is illustrated and described herein as a single mechanism. However, IOM 308 may be implemented by any number of mechanisms and is not limited to any particular mechanism. Furthermore, IOM 308 may be implemented in hardware, software, or any combination of hardware and software.

2. Creating "Stickiness" Via Transaction Proxying

As previously described herein, it is particularly desirable to allow customers to return easily to a shopping application from a merchant web page when making purchases over the Internet. According to one embodiment of the invention, stickiness is provided by using an IOM to proxy a merchant web page and thereby modify the merchant web page to include a navigation object that provides direct access to the original shopping application. This allows a customer to return easily to a shopping application by selecting a navigation object on a proxied merchant web page, regardless of whether links traversed by the customer have been redirected or "broken."

A. Proxying Links

One aspect of creating stickiness via proxying involves modifying links so that requests for data, e.g., web pages, and the requested data are redirected to IOM 308. Proxying links on a web page generally involves modifying links to address or "point" to IOM 308 instead of the original address or URL. When a proxied link is selected, the request for the corresponding merchant web page is sent to IOM 308 instead of the merchant web server. IOM 308 then makes a request to the merchant web server for the corresponding web page. Because IOM 308 requests the web page from the merchant web server, the requested web page is sent to IOM 308 instead of the customer. This allows IOM 308 to modify web page to add the navigation object, for example by modifying the HTML for the web page. In addition, IOM 308 may modify links to other merchant web pages to point to IOM 308 so that the other merchant web pages may also be modified.

For example, refer to FIG. 3 and a flow diagram 400 of FIG. 4. After starting in step 402, in step 404, a customer views a web page on web browser 302 that includes a link to merchant web page 304 on merchant web site 306. Suppose that merchant web page 304 has an unproxied URL of "http://www.merchant.com/productX," wherein "http" denotes the hypertext transfer protocol, "www" denotes the World Wide Web, and "merchant.com/productX" is the pathname for web page 304 on the WWW.

In step 406, the customer selects the unproxied link to merchant web page 304. In step 408, a request for merchant web page 304 is sent to IOM 308 over communications link 310. In step 410, IOM 308 modifies the URL of merchant web page 304 to include the address of IOM 308, followed by the original unproxied URL, or "http:/iom.inktomi.com/exec/iop/www.merchant.com/prodocutX." This allows IOM 308 to process the request for merchant web page 304 using the proxied link to identify the desired merchant web page.

In step 412, IOM 308 sends the request for merchant web page 304 to merchant web server 306. In step 414, merchant web server 306 processes the request for merchant web page 304 and sends merchant web page 304 to IOM 308. IOM 308 may also proxy links contained, or included, in merchant web page 304 as described hereinafter. The process is complete in step 416.

In some situations, it is possible for a customer to select or "follow" an unproxied link to another web page (not illustrated) on merchant web server 306. This would provide a bypass to IOM 308 and preclude IOM 308 from modifying the other web pages to add navigation objects. Specifically, selection of the unproxied link would cause the browser to request a target page directly from the merchant site. The merchant site would provide the page directly to the user, so none of the links in the target page would be proxied. Consequently, the IOM 308 would be circumvented in all further interaction between the user and the merchant. Therefore, according to one embodiment of the invention, links between merchant web pages are also proxied. Thus, in the present example, links on merchant web page 304 to other merchant web pages (not illustrate) are also proxied.

While the embodiments of the invention are described herein in terms of addresses that are comprised of URLs sent via HTTP over the WWW, the embodiments are not limited to URL addresses, HTTP, or the WWW. For example, the embodiments may be applied any communications protocol that incorporates addresses or any other data for locating objects.

B. Selective Proxying

While it is possible to proxy all links on a web page, it may not be desirable to do so in some situations. For example, suppose that merchant web page 304 contains a link to a particular credit card company's home page (not illustrated). In this situation, the shopping application may not want to continue proxying the transaction if the customer decides to follow the link to the credit card company's home page. Furthermore, the shopping application may not want to proxy all types of links or objects on a merchant web page, for example, links to graphical images or sound files. In this situation, it is desirable to leave these links unmodified so that the corresponding image or sound files are requested directly by the customer's web browser from the merchant web server. Since many of the links on a given web page are often graphics, selective modification of merchant links relieves IOM 308 of unnecessary traffic. Ultimately, the shopping application would likely only want to proxy those links to other web pages where the shopping application wants to include a navigation object back to its shopping application. Therefore, according to one embodiment of the invention, links on a web page are selectively proxied so that some links are left unchanged. The particular links selected for proxying depends upon the requirements of the particular application.

According to another embodiment of the invention, the "base" tag in HTML is used to direct all the relative URLs on merchant web server 306 to IOM 308. In this embodiment, there is no need to modify links that refer to other web pages so long as those links are updated as relative URLs and not absolute URLs. This is because all relative URLs will first go to IOM 308 because that is where the base tag is pointing. Instead, only those links that the shopping application does not want to handle are modified to refer directly back to the original URL, bypassing IOM 308 to which they would otherwise have been directed based on the base tag.

C. Proxying Secure Links

Sometimes transactions are processed using a secure communications protocol, such as secure sockets layer (SSL). Intermediaries typically pass along secure communications without modification in a process referred to as "tunneling."

According to one embodiment of the invention, IOM 308 proxies secure communications between participants in a manner similar to the proxying approach described herein for non-secure communications. In this embodiment, communications links 310 and 312 of FIG. 3 are secure communications links. Thus, requests by web browser 302 are sent to IOM 308 over communications link 310 using a secure communications protocol such as SSL. The requests are decrypted, examined and in some situations, operated on or otherwise modified by IOM 308. The requests are then re-encrypted and forwarded to merchant web server 306 via communications link 312 using a secure communications protocol. Similarly, data to be provided from web server 306 to web browser 302 is encrypted at merchant web server 306 and sent to IOM 308 over communications link 312 using a secure communications protocol. IOM 308 decrypts, examines, modifies and/or operates on the data. The data is then re-encrypted and sent to web browser 302 over communications link 310 using the secure communications protocol. Using IOM 308 to proxy secure communications in this manner allows IOM 308 to monitor and/or modify transactions.

D. Navigation Objects

Figure 5A:
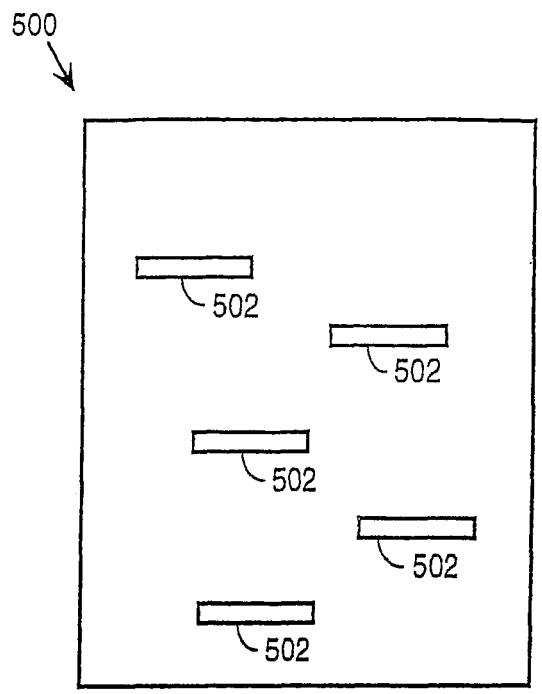
FIG. 5A is a diagram that depicts a conventional web page with a plurality of links.
Figure 5B:
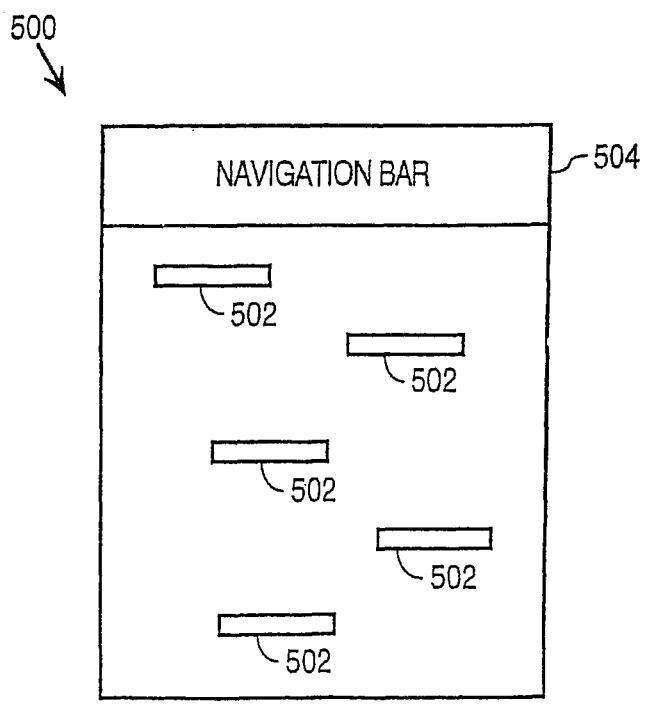
FIG. 5B is a diagram that depicts a web page with links and a navigation bar generated by an integrated order mechanism in accordance with an embodiment of the invention.

According to one embodiment of the invention, IOM 308 modifies web pages retrieved from merchant web server 306 to include a navigation object with a direct link back to a shopping application. The modified web pages are then provided to client 303. The navigation object may take a variety of forms and appearances and the invention is not limited to any particular form or appearance. For example, FIG. 5A illustrates a conventional web page 500 that includes a plurality of links 502. It is understood that web page 500 may include a wide variety of characteristics and attributes, such as graphics, that are not illustrated so as to not obscure the invention. FIG. 5B illustrates web page 500 with links 502 and a navigation bar 504 generated by IOM 308 in accordance with an embodiment of the invention. Locating navigation bar 504 at the top of web page 500 is generally the most predictable portion of a web page to modify and helps to avoid interfering with page-specific objects located elsewhere on web page 500.

According to another embodiment of the invention, navigation objects are created in separate frames that contain only the navigation objects. This avoids having to modify web pages to add navigation objects. For example, in FIG. 5B, navigation bar 504 may be created in a separate frame above web page 500. In this situation, web browser 302 would automatically provide a scroll mechanism, typically in the form of a scroll bar, to allow viewing of all portions of web page 500. Many different frame configurations are possible and the invention is not limited to any particular frame configuration. For example, navigation bar 504 may be created in a frame to the left of web page 500.

In some situations, merchant web pages contain one or more frames, referred to collectively as a frameset. In these situations, it is only necessary to add a navigation object to a single frame. The selection of a particular frame in a frameset for a navigation object depends upon the particular requirements of an application and the invention is not limited to any particular approach.

3. Tracking Transactions

According to another embodiment of the invention, an IOM is used to process orders over a communications network and facilitate tracking and collecting commissions owed by merchants to shopping applications.

A. Tracking the Origin of Transactions Using Address Data

According to one embodiment of the invention, address data is used to track the origin of transactions. In general, address data associated with one or more transactions is provided to a merchant or other entity to identify where a transaction was initiated or originated. For example, a tag like <inktomi> may be added to the URL being requested to indicate that a transaction was initiated from a shopping application provided by Inktomi. Address data may be provided to a merchant or other entity using a variety of techniques and the invention is not limited to any particular technique for providing address data to a merchant or other entity.

For example, address data may be generated and appended to the address of a requested merchant web page by a portal or shopping application. For example, to indicate that customer is using an Inktomi shopping application when the customer requests a merchant web page, the <inktomi> tag noted above may be appended to the requested URL as follows: "http://www.merchant.com/product/<inktomi>." Alternatively, the address data may be generated and appended to the address of a requested merchant web page by an IOM. For example, to indicate that customer is using an Inktomi IOM when the customer requests a merchant web page, a <inktomi.IOM> tag may be appended to the requested URL as follows: "http://www.merchant.com/product/<inktomi.IOM>."

Furthermore, many different types and forms of address data may be used depending upon the requirements of a particular application and the invention is not limited to any particular type or form of address data. For example, in the context of a customer purchasing goods over the Internet from a merchant, address data may be the URL, or a portion thereof, of the portal or shopping application that the customer used to access the merchant. According to one embodiment of the invention, address data is appended to the URL of a link to a merchant page to generate a modified URL. When the modified URL is received by the merchant server in a request, the merchant server is able to identify the portal or shopping application that directed the customer to the merchant.

Figure 1:
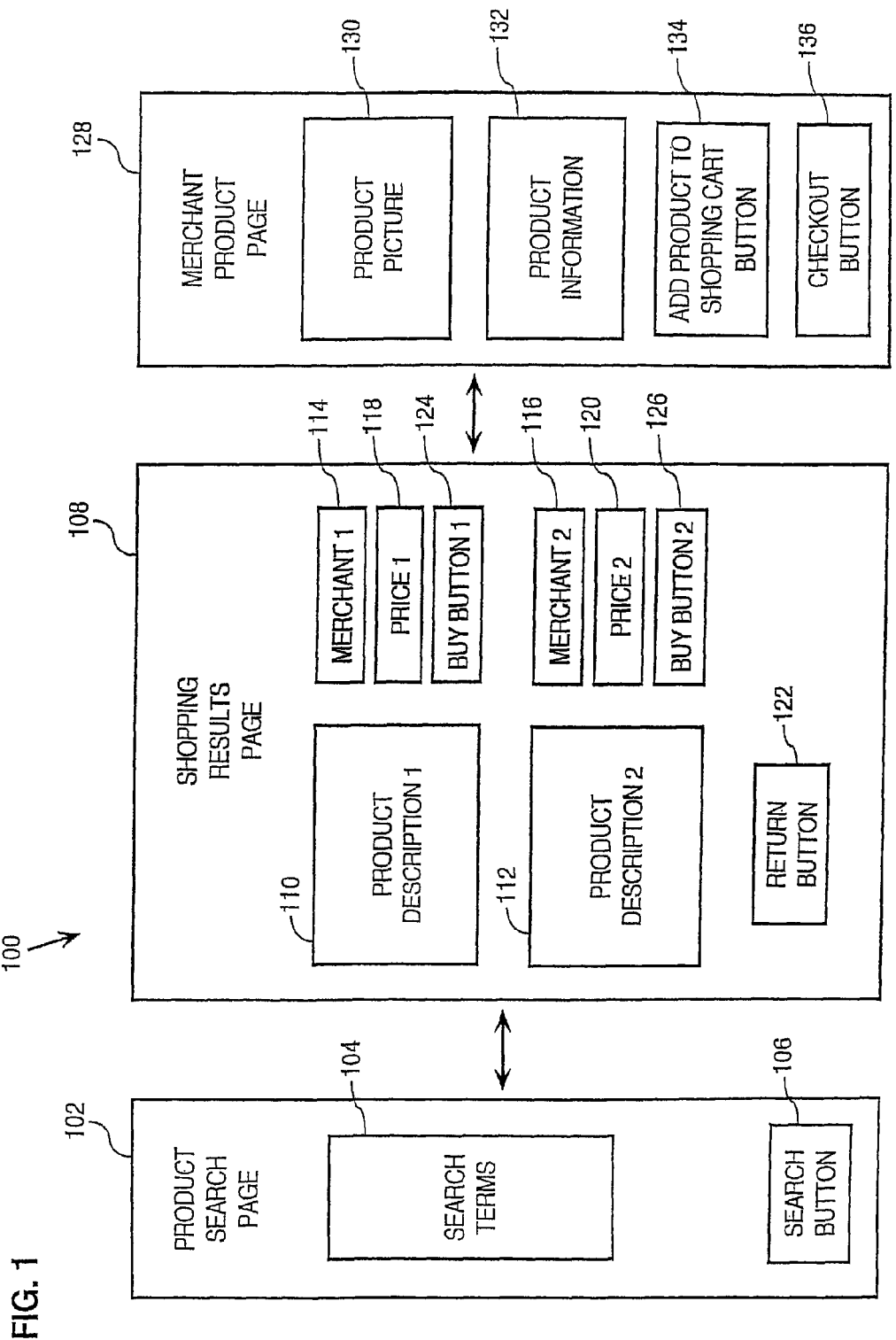
FIG. 1 is block diagram that depicts example web pages viewed by a customer while searching for a product using a conventional shopping application on the Internet.
Figure 2:
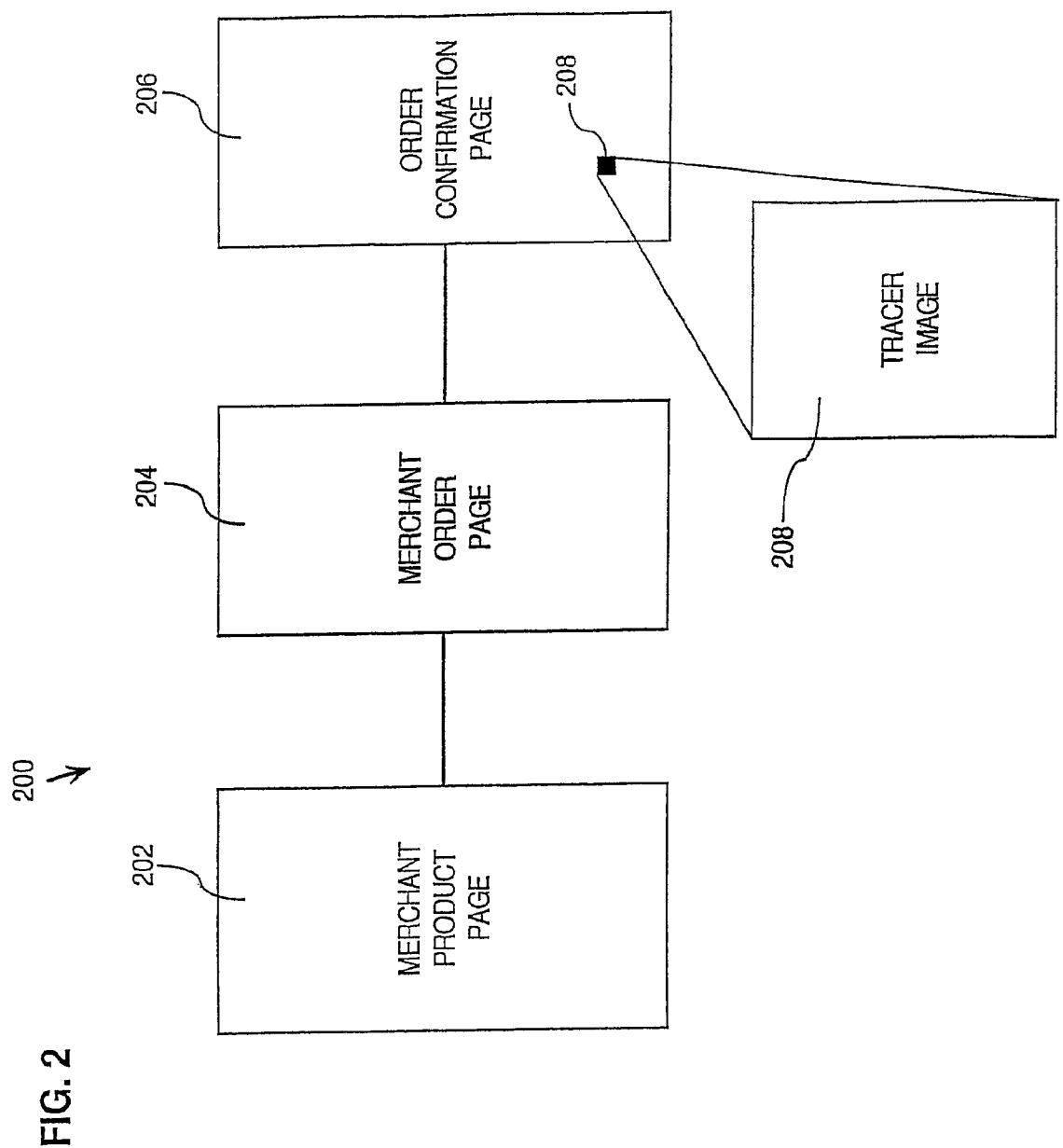
FIG. 2 is a block diagram that depicts example web pages and a conventional approach for using tracer images to track transactions.

For example, referring to FIG. 1, a customer selection of buy button 124 conventionally causes a request for merchant product page 128 to be sent to a merchant server (not illustrated) that hosts merchant product page 128. The request includes the URL of merchant product page 128. According to an embodiment of the invention, address data that identifies the portal or shopping application that hosts shopping results page 108 is added or "tagged" onto the URL of merchant product page 128. Hence, the address data is included in the request for merchant product page 128.

For example, suppose that the shopping application used by the customer is identified as "inktomi" and the URL of merchant product page 128 is "http://www.merchant.com/product/." In this example, the URL associated with the link (within shopping results page 108) to merchant product page 128 is modified to be "http://www.merchant.com/product/<inktomi>." This allows the merchant, or another third party, to know that the customer initiated the transaction from the Inktomi shopping application and that a commission is to be paid to Inktomi. Knowing that the transaction was initiated from Inktomi, the merchant may send a tracer image to Inktomi to facilitate payment of a commission.

B. Address Identifiers

URLs typically have a maximum length of two hundred fifty six (256) characters. Hence, there may be situations where appending address data to the URL of a merchant web page may exceed the specified maximum length for URLs. Therefore, according to one embodiment of the invention, if the length of a URL exceeds a specified threshold, then IOM 308 uses an address identifier to reduce the overall size of a modified URL. The merchant web site may then interpret the meaning of the address identifier by using a database or other mapping mechanism that relates the address identifier to the portion of the URL for which the address identifier is substituted.

An address identifier is generally a form of shorthand or code that corresponds to different types of address information. For example, an address identifier may indicate an address of a particular web page, such as a merchant web page, an address of a shopping application or portal, or any combination of these items.

Referring to the prior example, where the modified URL of merchant product page 128 is "http://www.merchant.com/product/<inktomi>," an address identifier may be used by IOM 308 to represent any portion of the modified URL. In this example, an address identifier, such as "<ID1>", may be substituted into the original URL by IOM 308 to represent only the product page portion of the unmodified URL of merchant product page 128. For example, "product/" in the unmodified URL may be replaced by the address identifier "<ID1>" as follows: "http://www.merchant.com/<ID1>/<Inktomi>" Alternatively, an address identifier may be used to represent only the indicator of the shopping application, e.g., "http://www.merchant.com/product/<ID2>." Address identifiers may be used to represent any portion of a modified URL and the invention is not limited to any particular portion.

Address identifiers may be used to indicate other types of information besides Internet addresses, web pages, or URLs. For example, an address identifier may identify a person or company, such as a merchant, a shopping application, an integrated order machine, or a customer. In addition, an address identifier may be used to indicate a particular transaction, a product that a customer may want more information about or that the customer wants to purchase, one or more participants in the transaction, or the subject of the transaction. In general, an address identifier may be used to identify any aspect, characteristic, or attribute of a transaction, and is not limited to the examples included herein.

According to one embodiment of the invention, the merchant web site uses a lookup or mapping mechanism or database to obtain the data or meaning associated with an address identifier. A variety of lookup or mapping mechanisms or databases may be used and the invention is not limited to any particular type or form of lookup or mapping mechanism or database.

For example, a merchant may be provided access to an address identifier database that is maintained by the merchant or a third party. Assume that a purchase is made on the merchant's web site using a shopping application that has incorporated an address identifier, such as "<ID2>", into the URL sent to the merchant web site. Upon receipt of the URL, the merchant recognizes "<ID2>" as an address identifier, such as by seeing the angled brackets in the URL. The merchant then extracts the address identifier and submits a query to the database to determine the meaning of the address identifier "<ID2>". The database provides data to the merchant that indicates that "<ID2>" stands for the identity of the corresponding shopping application or portal, such as <inktomi>. In this manner, the merchant may determine to whom to pay a commission.

The database may also contain additional information other than the identity of the shopping application or portal where the transaction originated. For example, the database may contain information that indicates the meaning of an address identifier, such as details about a particular customer, merchant, or product. The shopping application may use this additional information to provide more detailed reporting regarding the transactions facilitated by a shopping application.

C. Tracking the Origin of Transactions Using Cookies

An alternative embodiment to using address data to track the origin of transactions is the use of Internet "cookies" and tracer images. However, to understand this approach, it is helpful to understand what cookies are and how they are conventionally used before describing their use to track the origin of transactions.

Typically, cookies are created when a web server requests that a web browser store data on a user's computer in the form of a single line of information that is included in a file called "cookies.txt." However, web servers sometimes store data in separate files or cookies. Once stored on the user's computer, the user's web browser sends the cookie back to the web server that originally sent the cookie every time a new electronic document or web page is requested from that web server. The web server may also update or send a new cookie back to the user's web browser to be stored on the user's computer. Cookies are conventionally used to allow a web server to identify repeat users or customers and to allow the web server to customize its content based upon the user's preferences that are stored in the cookie. Other uses for cookies have also been developed, such as target marketing, tracking users as they navigate among web sites and facilitating online ordering.

According to one embodiment of the invention, a shopping application operates a server that is used to proxy transactions that originate via the shopping application. An example of such a proxy server is an IOM. The IOM records information about a transaction when the user navigates from the shopping application to the merchant web page. For example, the action of a customer selecting an object on a user interface to purchase an item causes the IOM to record information about the transaction. The recorded information may include identification of the shopping application or portal, the shopping application used, the product associated with the particular buy button that is clicked, the advertised price from the shopping results page, and other data associated with the transaction.

According to another embodiment of the invention, an Internet cookie is generated for each transaction that originates from a shopping application. The cookie is then stored at a specified location. For example, the cookie may be stored on an IOM, on an order confirmation tracking server hosted by the shopping application, or on any other server associated with the shopping application. The request to generate the cookie may originate from any participant in the transaction, including the merchant or the shopping application. The cookies are used to specify attributes of transactions, such as the identity of the customer, the identity or address of the merchant, the product chosen by the customer, the product's price, the date and time of the transaction, or any other data associated with the transaction.

In addition, the merchant includes a tracer image on the merchant's order confirmation page for each completed transaction. As described previously, the tracking URL for the tracer image may include data that specifies various attributes of transactions, such as the identity of the customer, the product or service chosen by the customer, the product's price, the date and time of the transaction, or any other data associated with the transaction. Significantly, the tracking URL for the tracer image need not contain, or include, any information about the origination address for the transaction, such as the URL of a shopping application at which the customer may have began the transaction.

As described previously, when the order confirmation page is sent to and displayed by the customer's browser, the information about the transaction is sent to the location identified by the tracking URL specified in the SRC attribute for the tracer image. If the merchant is affiliated with more than one shopping application, the merchant may include a tracer image for each shopping application. Upon receipt of the information from the tracking URL for the tracer image, a comparison may be made to information stored in the cookies.

A comparison by the shopping service provided of the information sent via the tracking URL of the tracer image to the information in the cookies determines if the transaction that resulted in the tracer image being sent originated with that shopping application. There will be cookies for all users of the shopping application, not just those users for a particular merchant. Similarly, there will be transaction information sent via the tracking URL of the tracer images for transactions by customers that used any of a number of shopping applications or no shopping application at all. Therefore, a comparison of the information for each transaction with a merchant is made to the user information, or vice versa. Also, the comparison to the cookies may be made upon receipt of each set of transaction information from the merchant via the tracking URL of the tracer image.

For example, the comparison may attempt to match the customer identification information between the merchant records and shopping application user records, along with other information such as the time of the purchase from the merchant relative to the time that the user used the shopping application. If the customer identification information are the same and the times of the user's visit to the shopping application and of the purchase are consistent, the shopping application concludes that that customer of the merchant accessed the merchant web site via the shopping application for that transaction. Thus, the shopping application may be owed a commission for that transaction.

The approach of using cookies to record user information and using tracer images from the merchant to record transaction information reduces record keeping efforts of the shopping application and merchant and allows for a more efficient and automated determination of commissions that are owed by the merchant to the shopping application. By using cookies, the shopping application does not otherwise need to separately track user information for determining commissions. By using tracer images, the merchant does not otherwise need to separately track transactions for determining commissions and then send that information to the shopping application for comparison to the user information.

While this approach is ideally well suited for situations involving a customer making a purchase via a shopping application over the Internet, the approach is applicable to any type of transaction between participants over any type of communications link. Furthermore, although embodiments are primarily described herein in the context of using cookies for purposes of explanation, the approach is applicable to other types of data used for the same purpose. Furthermore, while the cookies as described herein are being stored on an IOM, they could also be stored at other local or remote locations of either the shopping service provider or a third party.

FIG. 6 is a flow diagram that illustrates an approach for tracking transactions using cookies and tracer images according to an embodiment of the invention. The approach is also described with reference to FIG. 3.

After starting in step 602, in step 604, a customer uses web browser 302 to request a merchant web page 304 via a shopping application from a merchant web server 306. The request is sent to an IOM 308 over communications link 310. In step 606, IOM 308 requests the web page from merchant web server 306 over a communications link 312.

In step 608, merchant web server 306 sends a cookie to IOM 308. IOM 308 is a customer from the perspective of merchant web server 306. The cookie contains order information related to the user, the merchant, and the product desired.

In step 610, the customer places an order with the merchant by selecting one or more objects on a merchant web page that is proxied by IOM 308. In step 612, transaction information for the order is sent via a tracer image to IOM 308. Specifically, a merchant order confirmation page is displayed on the customer's browser. The merchant order confirmation page includes a tracer image so that when the tracer image is displayed, transaction information is sent via the tracking URL specified in the SRC attribute of the tracer image. In this example, the tracking URL corresponds to IOM 308 so that IOM 308 is the recipient of both the transaction information and the cookie sent in step 608 above. Other transaction information may be sent to IOM 308 by displaying other confirmation pages containing tracer images from the same merchant for other transactions, or by other merchants (not illustrated).

In step 616, IOM 308 compares the order data in the cookie to the order data sent via the tracer images to determine whether the order as described in the cookie data was placed via the shopping application. Different types of information may be compared to identify a match, depending upon the requirements of a particular application. For example, a comparison may be made for a particular transaction between the particular customer, the particular product, and the particular merchant as shown in the tracer image to the same types of information contained in the cookies stored on the IOM. If the cookie data matches the data sent via the tracer image, then the shopping application knows that it is owed a commission on that order from the merchant according to the agreed-upon terms. The process is complete in step 618.

Different types of data may be used to track transactions. In general, any kind of transaction data stored at a location associated with the shopping application may be used to match against such confirmation data supplied by the merchant. Even if a match cannot be made, a commission may be owed to the shopping application by the merchant for "driving" the customer to the merchant site.

According to another embodiment of the invention, redirect URLs may be used to generate cookies at other locations. When a redirect URL is used, a user's request for a particular URL is redirected from the original URL to another URL. For example, referring to FIG. 1, using redirect URLs, when a customer selects buy button 124, the customer's web browser requests a different web page than merchant product page 128. In this situation, a cookie is generated at the location where the other web page resides.

4. Order Form Pre-Filling

To complete transactions over a communications link, customers must provide certain information that is required by the transaction. The information required depends upon the requirements of a particular application and transaction. Example information includes shipping and payment information. The information is typically provided to merchants by using an order form. A merchant provides an order form to the customer's browser and the customer populates the fields in the form and returns the form to the merchant. Because this information is required for each transaction, many merchant web sites maintain customer information so that it does not have to be separately provided for each transaction. However, customers must provide this information when they visit a new merchant. In addition, if the customer information changes, then customers must update their information at every merchant site. Therefore, according to another embodiment of the invention, an IOM is used to perform order form pre-filling in a manner that avoids limitations associated with conventional transaction processing.

A. Merchant Web Pages

Figure 9:
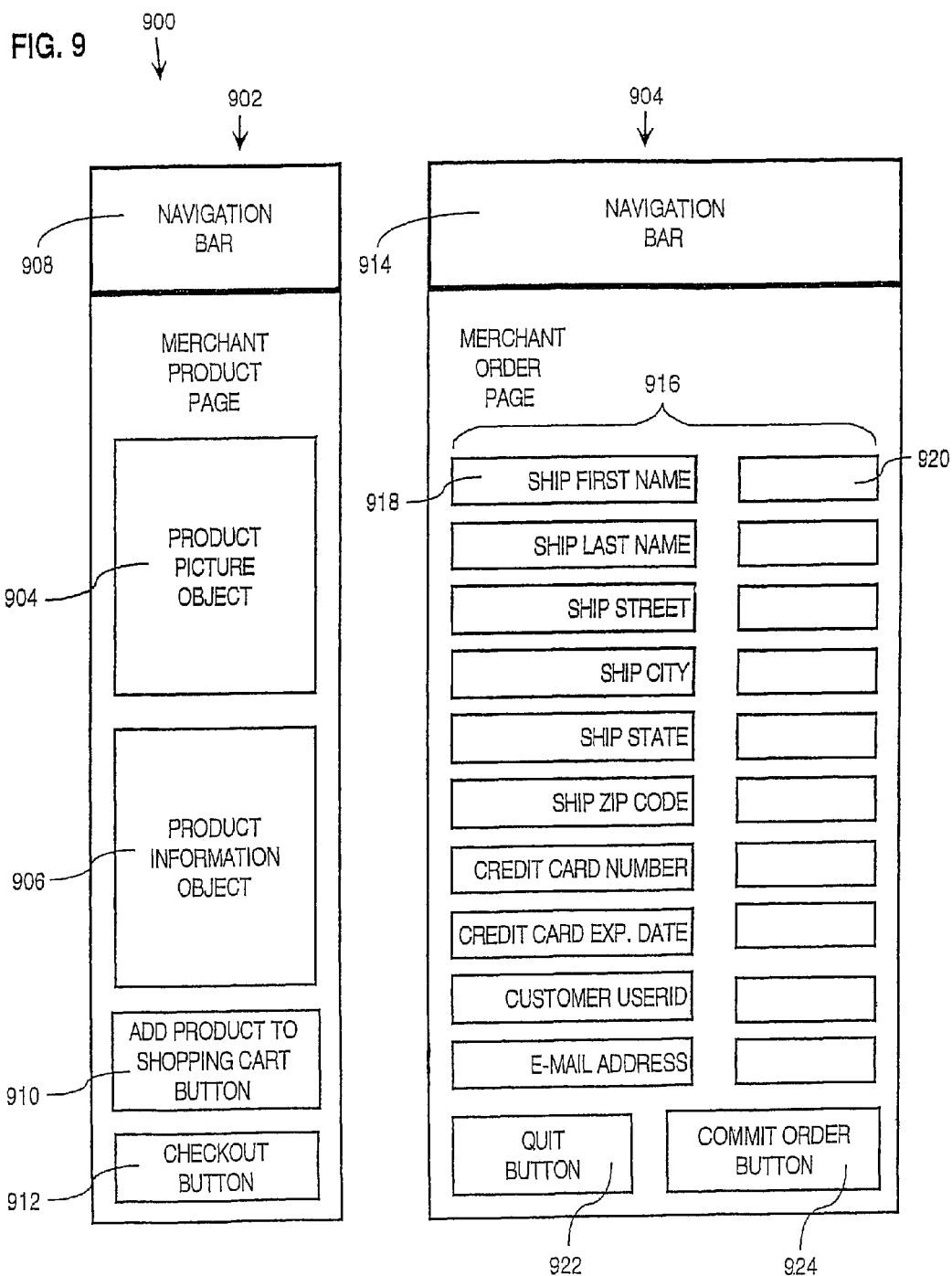
FIG. 9 is block diagram depicting examples of a merchant product page and a merchant order page according to an embodiment of the invention.

FIG. 9 is block diagram 900 depicting examples of a merchant product page 902 and a merchant order page 904 according to an embodiment of the invention. Various features and aspects of merchant product page 902 and merchant order page 904 are illustrated and described in the context of a customer purchasing a product over the Internet. However, the invention is not limited to the Internet context and is applicable to any type of communications network environment. Furthermore, for purposes of explanation only, merchant product page 902 and a merchant order page 904 are illustrated and described in the context of purchasing a single product. The invention, however, is not limited to the purchase of a single product and is applicable to multiple-product applications.

Merchant product page 902 provides information about a particular product through the use of a product picture object 904 and a product information object 906. A navigation object 908, in the form of a navigation bar 908, allows a customer to conveniently return to a shopping application or portal in accordance with an embodiment of the invention as previously described herein.

Merchant product page 902 includes various action objects that allow a user to initiate a particular action. In the present example, these action objects include "buttons" 910 and 912 for adding a product to a shopping cart and performing a "checkout" function, respectively. As is conventionally used in the context of Internet commerce, a "shopping cart" is a logical construct that indicates one or more items that a customer has indicated an intent to purchase. When viewing an item on a web site that a customer wishes to purchase, the customer selects button 910 to add the item to an imaginary shopping cart. When finished shopping, a customer selects button 912 to initiate a purchase of the selected items, i.e., items "in" the customer's shopping cart.

Selecting button 912 typically includes a link to merchant order page 904, which, when selected by the customer, causes merchant order page 904 to be retrieved and displayed on the customer's browser. Merchant order page 904 is used primarily to collect information from the customer that is required to complete the purchase transaction. In the present example, merchant order page 904 is being proxied by IOM 708 and includes a navigation object 914, in the form of a navigation bar 914, that allows a customer to conveniently return to a shopping application or portal. Merchant order page 904 includes a plurality of input fields with associated labels, generally indicated by reference numeral 916. For example, a "ship first name" label 918 denotes that the data to be entered in a particular input field 920 is the first name of the person to whom the product is being shipped. Other labels and fields are shown describing other shipping information needed or other types of user information such as details regarding the form of payment. A customer may use merchant order page 904 to enter all of the requested information into the appropriate input fields.

Once the customer has completed entering in all of the required information, the customer may take a number of actions. For example, if the customer decides not to complete the purchase, or wants to return to merchant product page 902 or some other page, the customer may click on a "quit button" object 922. Alternatively, if the customer wishes to complete the transaction, they may click on a "commit order button" object 924 to indicate to the merchant that the purchase is to be completed.

B. Order Form Pre-Filling Using a Wallet Server

The user of a wallet server to pre-fill an order form will be described in the following order: (1) obtaining customer information from a wallet server, (2) merchant web pages, (3) pre-filling of an order form, and (4) protecting customer information.

(1) Obtaining Customer Information from a Wallet Server

According to one embodiment of the invention, a wallet login process is initiated by a user selecting an object on a shopping results page that is associated with a desired product or merchant. This login process includes the use of a wallet server that accesses stored information about a user. The login process may take place directly between the user and a wallet server provider, without the assistance of a facilitator, such as a proxy server like an IOM. Thus, while it is possible to proxy the interaction between the user and the wallet server, the wallet login procedure need not be proxied by a shopping application.

The user may interact directly with a third party wallet server provider when the user makes use of the wallet login procedure, although the proxy server is still proxying the remaining aspects of the transaction by the user. In this situation, it is desirable for the proxy server to establish an easy return path back to the proxy server from the wallet server provider. The easy return path may be implemented by having the proxy server provide a static "exit" URL to the wallet server provider. The static "exit" URL may be a link back to the shopping application or proxy server. Also, the "exit" URL may specify the particular web page being provided by the shopping application that the user had last accessed before the user accessed the wallet server provider.

The wallet server provider may add the "exit" URL to the web pages provided by the wallet server provider. Therefore, whenever the user is interacting with the wallet service provider, the user may click on the "exit" URL on the wallet server provider web pages so that the user can return to the shopping application.

Figure 7A:
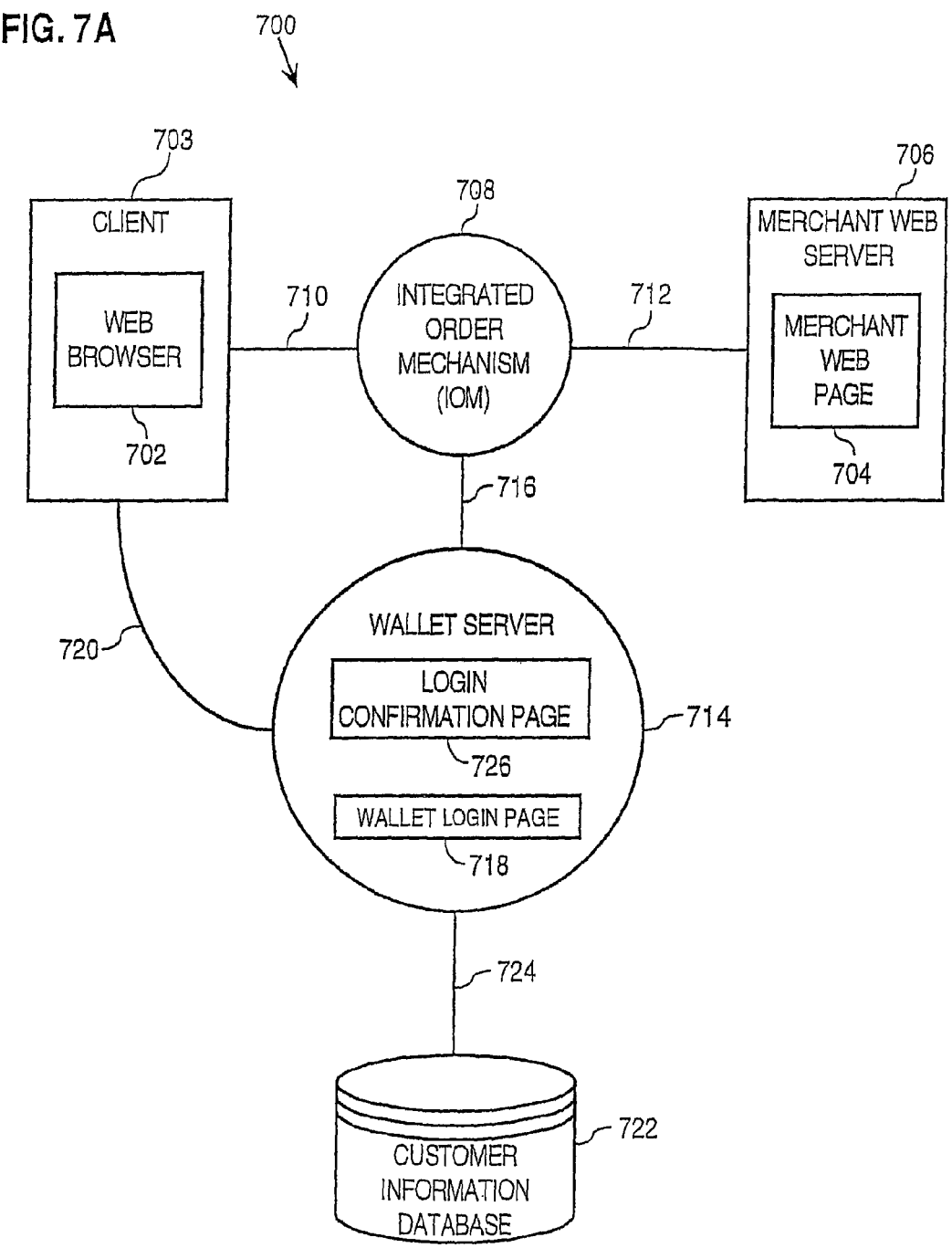
FIG. 7A is a block diagram of an architecture that includes a wallet server for pre-filling order forms according to an embodiment of the invention.

FIG. 7A is a block diagram 700 of an example architecture that includes a wallet server for pre-filling order forms according to an embodiment of the invention. A customer uses a web browser 702 that resides on a client 703 to request a merchant web page 704 that resides on a merchant web server 706. The customer makes the request through an IOM 708 and communications links 710 and 712. IOM 708 hosts a shopping application and proxies the purchase transaction on behalf of the customer.

According to an embodiment of the invention, when the customer makes a request for merchant web page 704, IOM 708 determines whether the merchant associated with merchant web server 706 is a merchant for which IOM 708 is to proxy transactions. If so, then IOM 708 redirects the request for merchant web page 704 to wallet server 714 via a communications link 716.

In response to receiving the request for merchant web page 704, wallet server 714 transmits a wallet login page 718 to client 703 over a communications link 720 for display on web browser 702. Wallet login page 718 includes queries for information, or validation data, that uniquely identifies the customer. For example, wallet login page 718 may contain fields for requesting a login identification and password. The customer populates the fields and then sends the information to wallet server 714 over communications link 720.

Upon receipt, wallet server 714 verifies or validates the validation data received from the customer. If the login is successful, wallet server 714 retrieves customer information for the customer from a user information database 722 over a communications link 724. Wallet server 714 also sends a login confirmation page 726 to client 703 for display on web browser 702 to inform the user that the login was successful. According to one embodiment of the invention, login confirmation page 726 includes an exit object (not illustrated). When selected by the customer, the exit object returns to merchant web page 704.

The customer information retrieved from user information database 722 is provided to IOM 708 over communications link 716. The customer information may be provided to IOM 708 any time after retrieval. For example, the customer information may be provided to IOM 708 after the customer selects the exit object from login confirmation page 726.

After IOM 708 receives the customer information, a cookie, referred to herein as a "wallet cookie," is generated and sent by IOM 708 to web browser 702 that then stores the wallet cookie on client 703. The wallet cookie contains the customer information sent by wallet server 714 to IOM 708, as discussed above. The customer information in the wallet cookie stored on client 703 may be used later in pre-filling a merchant order form.

According to one embodiment of the invention, the customer may modify its corresponding customer information stored on user information database 722. In addition, the customer may modify its corresponding information before the information is sent to IOM 708. For example, the customer may update existing information, add additional information, or select information to use in a particular transaction, such as by specifying multiple shipping addresses. When the customer review is complete, the final customer information is sent from the wallet server 714 to IOM 708. Customer information may be temporarily stored at IOM 708 for use in several transactions. IOM 708 may use the customer information to pre-fill order forms provided to the customer.

Customer information may be sent from wallet server 714 to IOM 708 using a variety of techniques and the invention is not limited to any particular technique. For example, according to one embodiment of the invention, customer information is provided to IOM 708 using a tracer image contained in login confirmation page 726. Specifically, the customer information is sent via the tracer image to the server specified in the SRC attribute of the tracer image. The server specified in the SRC attribute may then sends a cookie containing the customer information to IOM 708.

In an alternative embodiment, customer information is sent to IOM 708 using what is referred to in HTTP as the "post" method (as opposed to the "get" method). According to the post method, wallet server 714 sends or posts customer information to the IOM 708 via a "form" element in HTML. Form elements hold more data than a typical tracer image since tracer image URLs are typically limited to two hundred fifty six (256) characters.

After the customer information is retrieved, IOM 708 proceeds to proxy the transaction between the customer and merchant. According to one embodiment of the invention, the URL of merchant web page 704 is appended to the URL of wallet server 714 during the wallet login process. As previously described, address identifiers may be used to ensure that the URL does not exceed its maximum allowable size as a result of appending the URL for merchant web page 704 to the URL of wallet server 714.

According to another embodiment of the invention, IOM 708 sends to wallet server 714 a cookie that specifies the desired merchant product page before the customer begins the wallet login process. When that process is complete and the user returns to the shopping application, that cookie is sent back to IOM 708 by wallet server 714. IOM 708 uses the cookie to determine the particular merchant web page that the customer originally specified when the user left the shopping results page and went to wallet server 714.

(2) Pre-Filling an Order Form

Figure 8:
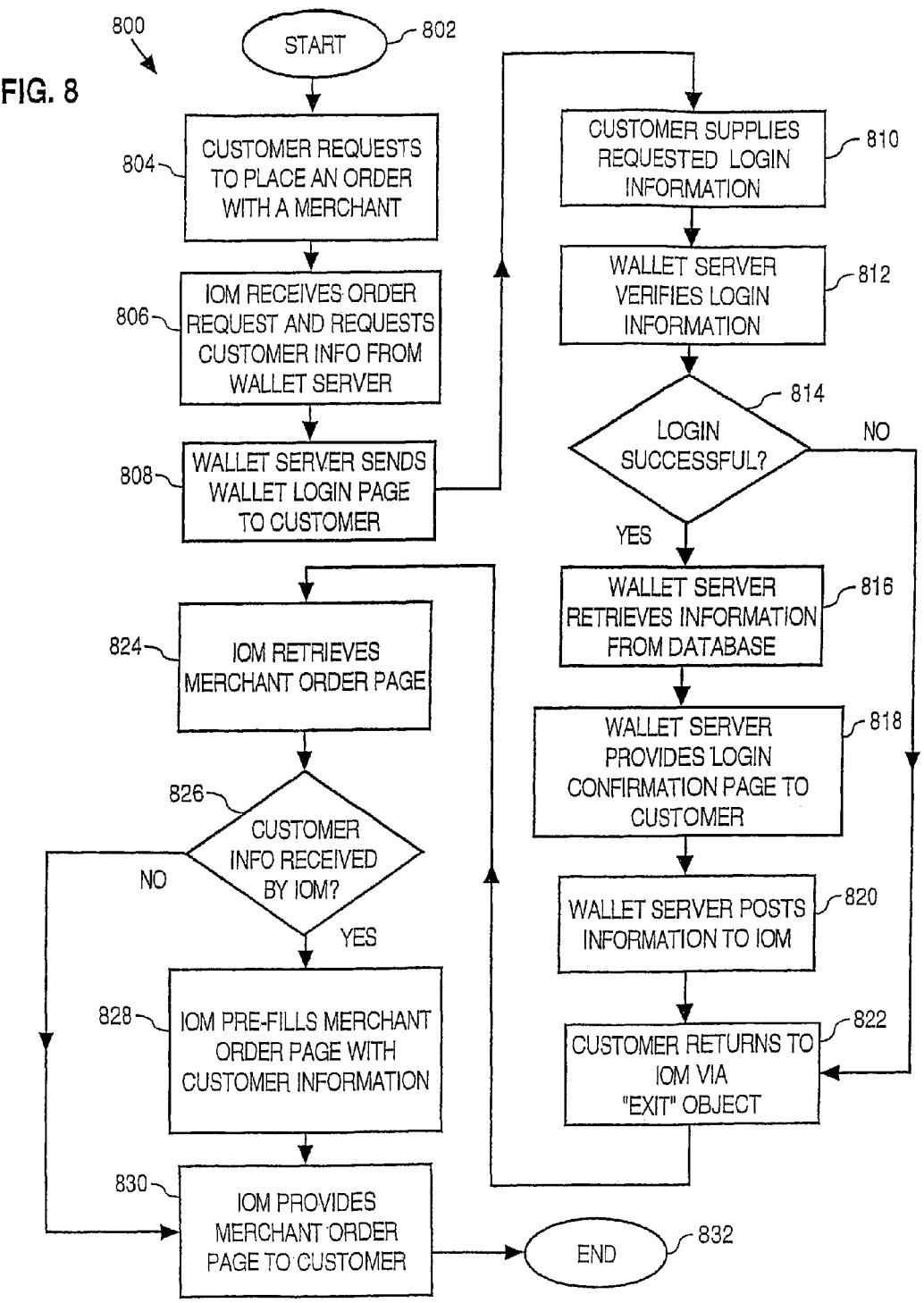
FIG. 8 is a flow diagram depicting an approach for pre-filling order forms using a wallet server in accordance with an embodiment of the invention.

FIG. 8 is a flow diagram 800 depicting an approach for dynamically pre-filling order forms using a wallet server in accordance with an embodiment of the invention. For purposes of explanation, reference is also made to FIG. 7A. After starting in step 802, in step 804, a customer requests to place an order with a merchant by interacting with a shopping application or portal web page on web browser 702. This causes a request to be sent to a proxy server, which in the present example is IOM 708.

In step 806, IOM 708 receives the order request from the customer and requests information for the customer from wallet server 714. In step 808, wallet server 714 sends wallet login page 718 to client 703 over communications link 720. In step 810, the customer provides to wallet server 714 information requested on wallet login page 718, such as a User ID and password.

In step 812, wallet server 714 verifies the login information and in step 814, a determination is made whether the login was successful. If so, then in step 816, wallet server 714 retrieves the information for the customer from user information database 722.

In step 818, wallet server 714 provides login confirmation page 726 to client 703. In step 820, wallet server 714 provides or "posts" the customer information to IOM 708.

In step 822, the customer "returns" to IOM 708 via an "exit" object on login confirmation page 726. Note that if in step 814, the customer login was unsuccessful, then the customer is automatically returned to IOM 708 via the URL associated with the "exit" object on login confirmation page 726.

In step 824, IOM 708 retrieves a merchant order page (not illustrated) from merchant server 706. In step 826, a determination is made whether customer information was received for the customer. If so, then in step 828, IOM 708 automatically populates or pre-fills the retrieved merchant order page with the customer information received from wallet server 714. Various techniques for pre-filling a merchant order page are described in more detail hereinafter.

In step 830, IOM 708 provides the merchant order page to client 703. Note that if in step 826 a determination was made that customer information was not received from wallet server 714, then the merchant order page is provided to the customer without being pre-filled. In this situation, the customer manually populates the fields on the merchant order page. The process is complete in step 832.

It should be understood that although the approach for dynamically pre-filling merchant order pages has been described in the context of retrieving customer information from a wallet server 714 and customer information database 722, any type of information storage and retrieval mechanism may be used. Furthermore, for purposes of explanation, in FIG. 7A, client 703 is illustrated and described as being directly connected to wallet server 714 via communications link 720. Communications between client 703 and wallet server 714 may instead be proxied by other entities. For example, communications between client 703 and wallet server 714 may be proxied through IOM 708 or another mechanism. Finally, this example has been illustrated and described in the context of a customer placing an order with a merchant over the Internet, but the approach is also applicable to any type of transaction between participants over any type of communications network.

(3) Protecting Customer Information

Customer information may contain personal contact information and financial information that needs to be protected. The architecture depicted in FIG. 7A allows various techniques to be employed to protect customer information. For example, customer information stored in customer information database 722 may be encrypted using any type of encryption. In addition, communications links 710, 716 and 720 may be secure communications links. For example, SSL may be used to protect communications over communications link 710, 716 and 720.

Furthermore, customer information stored on wallet server 714, client 703 or IOM 708 may be encrypted. For example, in the situation where client information is stored in a wallet cookie on client 703 or IOM 708, an encrypted wallet cookie may be used to protect the client information. Encrypted cookies may be use in combination with, or as an alternative to using secure communications links 710, 716 and 720. For example, if SSL is used to encrypt data transmitted over communications links 710, 716 and 720, messages are encrypted before being sent and then decrypted upon receipt. Because the wallet cookie is encrypted separately before it is prepared for transmission, it will still be encrypted after receipt by the user's computer. In this situation, customer information is encrypted twice.

According to another embodiment of the invention, non-persistent wallet cookies are used so that they automatically expire when wallet cookie expiration criteria are satisfied. The wallet cookie expiration criteria may include, for example, a specified amount of time, a specified number of transactions, or whether specific transactions have been completed. The particular wallet cookie expiration criteria may be selected to allow a wallet cookie to be available to pre-fill multiple order forms from one or more merchants. This precludes the need for the user to religion to the wallet server to retrieve that information if multiple orders are made. It also precludes the need to store the wallet information on the proxy server, so that it can remain stateless. Because the wallet cookie is set when the first merchant web page is proxied, it will be resent by the user's web browser to the proxy server each time the user accesses a web page on that merchant's web site via the proxy server. Therefore, the user information in the wallet cookie will be available to the proxy server when the user goes to an order form on the merchant web site.

C. Order Form Pre-Filling Using Variable Mapping

According to one embodiment of the invention, order form pre-filling is performed generally by identifying variables, inputs, or other data fields on the order form. Those variables, inputs, or data fields that require information about the user on the order form are identified and then portions of the user information for the appropriate variables are substituted into the form. For example, on an Internet web page written in HTML, such variables would typically appear as an input element. A particular variable for the first name of the person to whom the product would be shipped might appear as follows in HTML:

<!--Shipping First Name-->
<input type=text name=sfname value="John">

In this example, the first line is an HTML comment line that describes the HTML on the following line. The information on the second line is interpreted as follows: "input" denotes that this is an input variable element in HTML; "type=text" denotes that the type of input for this element is text, as opposed to another type such as numerical; "name=sfname" denotes that the name of this variable is sfname; and "value="John"" denotes that the initial or current value of this variable is the text string "John."

In practice, variables sometimes are not established with initial values as in the above example. Order forms may nevertheless be modified to include or modify the value of variables based upon user information, e.g., user information retrieved from a wallet server as discussed in the examples above.

Different merchants sometimes use different variable names for the same information. For example, Merchant A may refer to data for the "ship first name" as "sfname" while Merchant B refers to it as "ship_first_name." Furthermore, either or both of these sample variables names could be different from the variable name used to identify the same information in the user information from the wallet server. For example, the user information from the wallet server may have the user's name stored together in a variable called "ship_full_name" that contains the first name, middle initial, and last name of the user.

There are several ways to identify the variables that correspond to various portions of the user information. According to one embodiment of the invention, a mapping is used to match portions of user information retrieved from a wallet server to variables contained on a merchant order page. This mapping associates particular portions of user information based on the variable name included in the HTML for the merchant's order form.

There may be situations in which the mapping is unable to match a variable on an order form to a portion of the user information. One approach might be to leave that variable unchanged. However, an alternative embodiment is to look at the context associated with the variable on the order page as it appears to the user. For example, the variable name for the ship first name on a particular merchant's web page might just be "name1" from which it would be unclear whether that was referring to the first or last name. However, the variable on the form may have a more descriptive label that aids the user in providing the proper information. For example, referring to FIG. 9, "ship first name" 918 displays a description of the information to be entered into input field 920 that is used to specify the value of "name1" which makes clear that the proper input for "name1" is the first name.

While the example above just looked at the context for a particular variable, a similar approach may be used to look at a larger context. For example, the immediate or local context for a particular variable on the web page as it appears to the user may simply say "Name." It may be unclear from this local context and the variable name whether this is the first name, last name, or entire name of the person. But by looking at the larger or more global context, such as other input descriptions on the web page, it would likely be clear that "Name" referred to the complete name of the person if there were no other name related fields.

Another situation that arises with order forms is that variables may be sent from the order form provider with values already included. In one situation, the merchant may have already identified the user as a repeat customer and therefore has already pre-filled the order form based on the information from the customer's last purchase. The merchant may also operate its own wallet server to collect and retrieve user information. In this situation, the shopping application may elect to leave alone any such information already included on the merchant order page instead of pre-filling or modifying the order page based on the wallet information that the shopping server provider has retrieved from a wallet server.

In another situation, the value of a variable may be predetermined or specified as the order page is retrieved from the web server. But while the value is predetermined, it may not represent a real value. For example, the order form may contain a pull down selection object to select a destination shipping state. It is likely that the first value in that pull down list is a text string such as "Select the state from this pull down list." Having such a value serves as a guide to the customer when completing the form, but it is not a proper value for the name of the state. In this situation, the shopping application may elect to de-select that non-real value and substitute the proper value for the state name variable.

According to another embodiment of the invention, if the mapping, local context, and global context fail to allow the variable to be properly identified, then it is left unchanged so that the user must manually enter the information into the order form. The shopping service may also keep a log of such variables that could not be matched to user information for an operator to evaluate and update the mapping to properly match the variable in the future.

D. Adaptive Single-Click Transactions

In some situations, all input fields and variables can be matched to user information from a wallet server. For example, a merchant order form may consist of several pages, one for shipping information, one for purchaser information, and one for payment information. If the wallet information can be used to complete all of the fields on all of those pages, it may not be necessary to present each of those pages separately to the user for their review. Instead, all three pages in this example could be pre-filled by the shopping application and the entire list of input information as completed can be shown to the user to verify the accuracy of the information or update it to reflect any changes as necessary. This is sometimes referred to as a "one-click purchase" because only a single click on an object on the merchant web page is needed to get the merchant all of the information necessary to complete the purchase transaction.

As discussed above, upon leaving the shopping application shopping results page, a customer may either be sent directly to the merchant web site or indirectly to the merchant web site via a proxy server. A third alternative is that the customer is taken first from the shopping results page to another page that is used to allow the proxy server to get access to stored information about the user. Typically the other page or server will contain information about a plurality of users that may be accessed after the user logs into that system. After completing the login procedure, the proxy server will then receive information about the user. At that point, the proxy server accesses the merchant web site desired by the user. Then if the user decides to make a purchase from a merchant, the user information may be used to pre-fill the order form by a proxy server before sending it to the user's web browser for display and to collect any additional information.

The order form pre-filling approach described above preserves the content of merchant web pages, i.e., merchant order pages. In addition, the pre-filling of a merchant's order page takes place automatically, so that the merchant may keep the content of their web pages visible to the user. The approach is a general, flexible approach applicable to all merchant web sites. There is therefore no need to customize the order form pre-filling process for each merchant web site or order form. Also, user information may only need to be accessed once to use it on more than one order form or to use it with more than one merchant. Because the login procedure takes place before the user accesses the merchant web site, there is no interruption in the user's experience in interacting with the merchant web site. Such interruptions are greatly disfavored by merchants.

5. Fail-Over Applications

In practice, facilitating a transaction as described herein is performed on a large scale with many participants and many transactions being facilitated at any given time. In some situations, failures occur because of a large amount of traffic that must be processed. For example, there could be a problem in proxying a particular web server, unusually high load on a particular proxy server, or an unusually large number of error conditions. As a result, it may not be possible to continue proxying transactions, tracking commissions, providing stickiness, or perform order form pre-filling. Under such circumstances, it may be desirable to discontinue the facilitation of the transactions and allow the participants in the transaction to interact directly. For example, a customer may be in the process of purchasing a product from a merchant where that transaction was being proxied by an IOM, and an error condition occurs. In this situation, it may be desirable to discontinue proxying so that the customer and merchant may continue the transaction without any proxying or other actions being taken by the IOM.

A variety of approaches may be taken to identify problems that warrant discontinuing facilitating a transaction. For example, a shopping application may review transaction logs for errors, such as getting a "page not found" error from a merchant web server. The shopping application may also discover that they are no longer able to pre-fill the order forms for a particular merchant. At particular times of the year, for example, during holidays, the amount of shopping traffic for a merchant may be so unusually large that proxying transactions slows down the shopping experience for users to an unacceptable level.

Therefore, according to one embodiment of the invention, the proxying of one or more transactions is selectively discontinued. For example, a particular transaction may be redirected by ceasing the proxying of the merchant URLs (e.g., by not rewriting the original merchant URLs) so that a user interacts directly with a merchant. Alternatively, a merchant may be removed from a shopping application "inclusion list" of merchants for whom transactions are to be proxied.

According to another embodiment of the invention, the overall level of traffic being handled by a shopping application is monitored. If the traffic exceeds a specified maximum limit, then a "master switch" is used to cease proxying for a certain subset or even all of the transactions currently being processed. This allows selected transactions to continue unproxied, as well as allow unselected transactions to continue to be proxied.

6. Multiple Vendors

The approach for processing transactions has been described in the context of processing transactions from a single merchant for purposes of explanation. The invention is not limited to this context however, and transactions between a client and multiple merchant sites may be processed using the approach described herein. The benefits of providing stickiness, tracking commissions and order form pre-filling may be realized for transactions between a client and any number of merchant sites. According to one embodiment of the invention, a "Universal Shopping Basket" approach is used to process transactions between a client and any number of merchant sites. FIG. 7B illustrates the approach as previously described with respect to merchant web server 706 and also with merchant web server 730, communicatively coupled to IOM 708 via a communications link 732 and hosting a merchant web page 736, and merchant web server 738, communicatively coupled to IOM 708 via a communications link 740 and hosting a merchant web page 742.

7. Multiple Communication Protocols

Figure 7C:
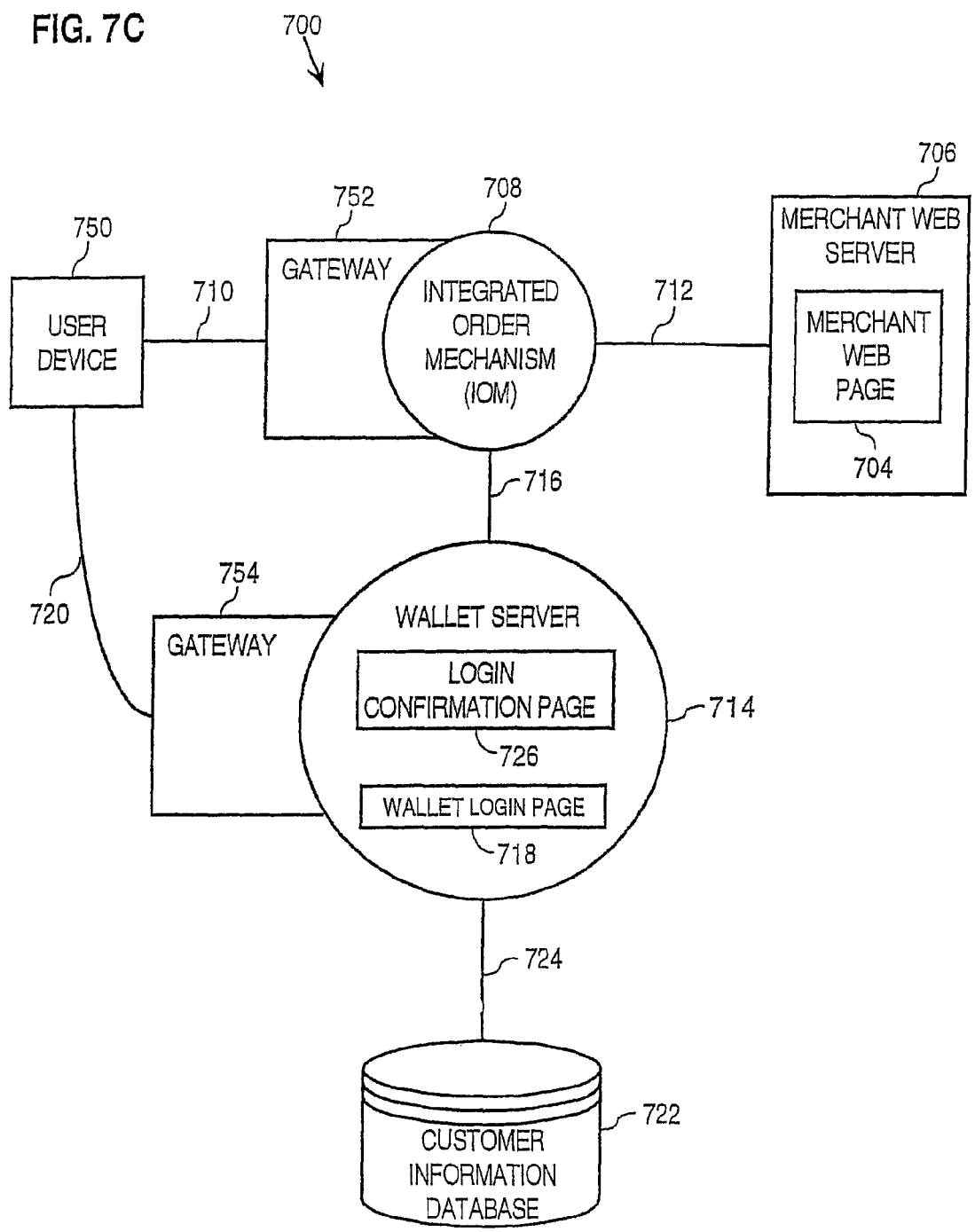
FIG. 7C is a block diagram of an arrangement for processing transactions between a user device that supports a first communications protocol and a merchant web site that supports a second (and different) communications protocol according to an embodiment of the invention.

The approach for processing transactions has been described herein primarily in the context of a client and one or more merchant sites that support the same communications protocol. The approach is also applicable to transactions between user devices and merchant web sites that support different communications protocols. FIG. 7C is a block diagram of an arrangement 700 for processing transactions between a user device that supports a first communications protocol and a merchant web site that supports a second (and different) communications protocol according to an embodiment of the invention. A customer uses a user device 750 to send requests for information to IOM 708 via communications link 710 and a gateway 752. User device 750 may be any type of non-web browser device, such as a Wireless Access Protocol (WAP) device, a cellular telephone or a Personal Digital Assistant (PDA). Arrangement 700 includes a gateway 752 communicatively coupled to IOM 708. Gateway 752 is configured to convert data generated and transmitted by user device 750 in a first communications protocol supported by user device 750 into a second communications protocol supported by IOM 708. Gateway 754 is also configured to convert data generated and transmitted by IOM 708 in the second communications protocol into the first communications protocol supported by user device 750.

Examples of the first communications protocol include non-web browser, i.e., non-HTTP, protocols, such as a WAP. Examples of the second communications protocol include the HTTP protocol. Thus, arrangement 700 of FIG. 7C allows transactions between non-web browser type user devices and web-browser type merchants to be managed and processed by IOM 708 in accordance with the various embodiments described herein. More specifically, arrangement 700 of FIG. 7C allows IOM 708 to proxy transactions between user device 750 that supports a first communications protocol and a merchant web server 706 that supports a second (and different) communications protocol.

Arrangement 700 of FIG. 7C also includes a gateway 754, communicatively coupled to wallet server 714. Gateway 754 is configured to convert data generated and transmitted by user device 750 in the first communications protocol supported by user device 750 into the second communications protocol supported by wallet server 714. Gateway 754 is also configured to convert data generated and transmitted by wallet server 714 in the second communications protocol into the first communications protocol supported by user device 750. In this configuration, user device 750 may be used to create, update or delete information from wallet server 714, even though user device 750 and wallet server 714 support different communications protocols.

8. Implementation Mechanisms

The approach for processing transactions over a communications link is applicable to a wide range of applications and the invention is not limited to any particular application or context.

Embodiments of the invention may be implemented in hardware circuitry, in computer software, or a combination of hardware circuitry and computer software and the invention is not limited to a particular hardware or software implementation. For example, the approach of using a shopping service provider to proxy transactions may be integrated into a shopping service application, a proxy server such as an integrated order machine, or a combination thereof.

Furthermore, embodiments of the invention are described herein for clarity by showing different functions being performed by different and separate entities, machines, or servers. However, the functions may be both shared among more than one entity and also combined in a particular entity. For example, referring to FIG. 7A and the associated discussion above, IOM 708 is described as performing the function of proxying transactions and wallet server 714 is described as providing customer information from customer information database 722. However, the function of proxying of transactions may be shared by more than one server or integrated order machine, instead of just a single server such as IOM 708. Also, the function of providing customer information from a customer information database may be included on IOM 708 instead of being performed by a separate wallet server, such as wallet server 714. Similarly, the functions described herein may be shared or combined using other entities, such as client 703, merchant web server 706, or other servers or machines.

Figure 10:
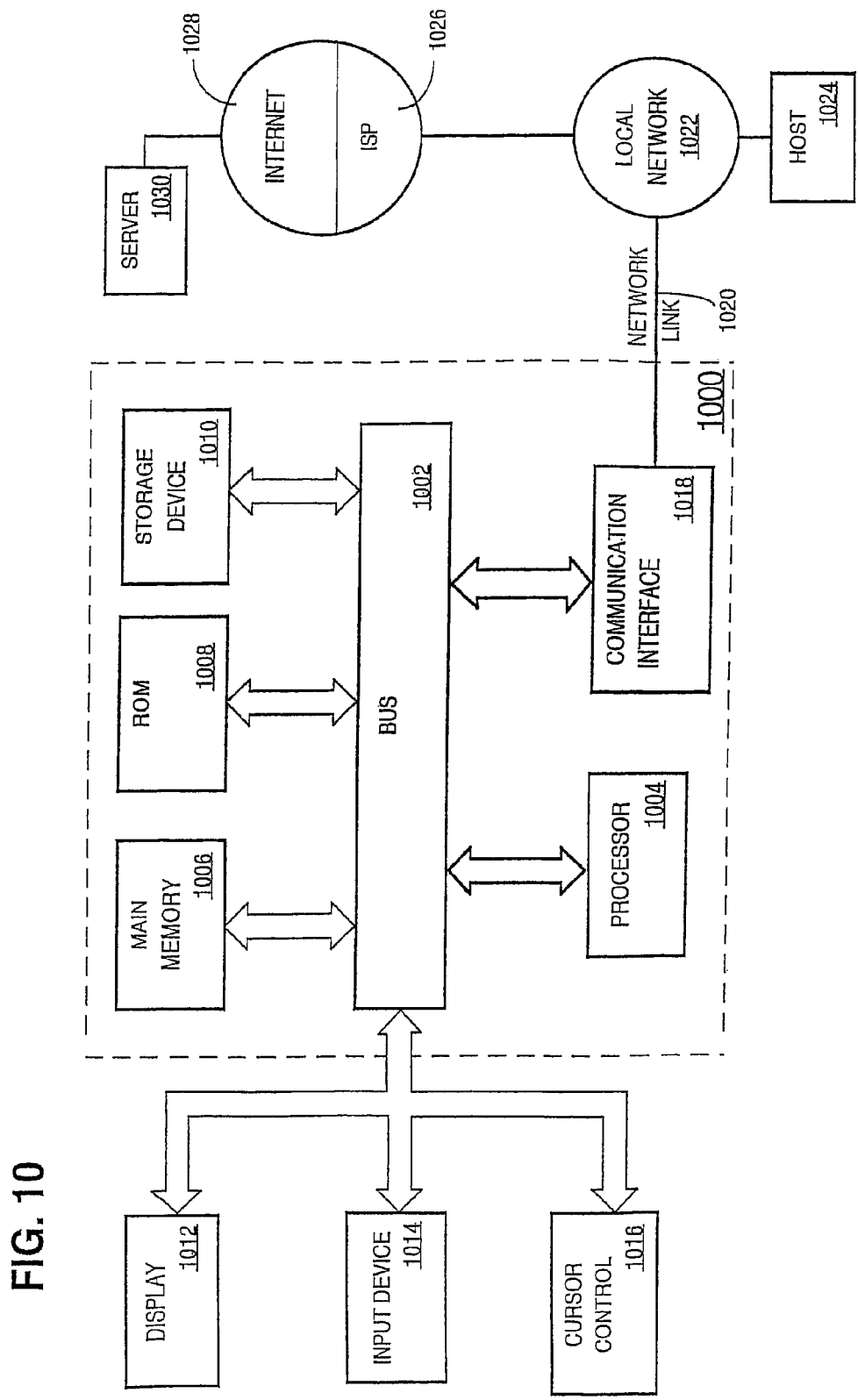
FIG. 10 is a block diagram of a computer system upon which embodiments of the invention may be implemented.

FIG. 10 is a block diagram that illustrates a computer system 1000 upon which an embodiment of the invention may be implemented. Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for processing transactions over a communications link. According to one embodiment of the invention, processing transactions over a communications link is provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. One or more processors in a multi-processing arrangement may also be employed to execute the sequences of instructions contained in main memory 1006. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media may also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector coupled to bus 1002 can receive the data carried in the infrared signal and place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for processing transactions over a communications link as described herein.

The received code may be executed by processor 1004 as it is received, and/or stored in storage device 1010, or other non-volatile storage for later execution. In this manner, computer system 1000 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   receiving, by an intermediary device from a client device, a request to place an order with a merchant;
   making a determination that the intermediary device is a proxy for transactions with the merchant;
   receiving, by the intermediary device, a data value from a wallet server in response to the determination;
   forwarding, by the intermediary device, the request to a merchant server;
   receiving, by the intermediary device, an electronic document from the merchant server in response to the request, wherein the electronic document comprises a variable;
   establishing, by the intermediary device, that the data value conforms to a context in which the variable is used in the electronic document; and
   substituting, by the intermediary device, the data value for the variable in the electronic document in response to the establishing.

2. The method of claim 1, further comprising:
   generating, by the intermediary device, an updated electronic document after substituting the data value; and
   transmitting, by the intermediary device, the updated electronic document to the client device in response to the request.

3. The method of claim 1, further comprising:
   storing, by the intermediary device, the data value in association with the context;
   determining, by the intermediary device, that a different variable in a different electronic document corresponds to the context; and
   substituting, by the intermediary device, the data value for the different variable based on the determining.

4. The method of claim 1, further comprising:
   storing, by the intermediary device, the data value via an Internet cookie.

5. The method of claim 1, further comprising:
   associating, by the intermediary device, the data value with a user identifier.

6. The method of claim 2, wherein the electronic document is a web page, and the updated electronic document is an updated web page.

7. The method of claim 1, wherein the electronic document comprises an input description associated with the variable.

8. The method of claim 1, wherein the electronic document comprises an input description associated with another variable in the electronic document.

9. A computer-readable memory device having instructions stored thereon that, in response to execution by a processing device, cause the processing device to perform operations comprising:
   receiving from a client device a request to place an order with a merchant;
   requesting a data value from a wallet server in response to determining that communications with the merchant are proxied;
   receiving an electronic document from a merchant server in response to the request, wherein the electronic document includes a variable;
   making a determination that the data value conforms to a context in which the variable is used in the electronic document; and
   substituting the data value for the variable in the electronic document in response to the determination.

10. The computer-readable memory device of claim 9, wherein the operations further comprise:
    generating an updated electronic document after substituting the data value; and
    transmitting the updated electronic document to the client device in response to the request.

11. The computer-readable memory device of claim 9, wherein the operations further comprise:
    storing the data value in association with the context;
    determining that a different variable in a different electronic document corresponds to the context; and
    substituting the data value for the different variable based on the determining.

12. The computer-readable memory device of claim 9, wherein the operations further comprise storing the data value via an Internet cookie.

13. The computer-readable memory device of claim 9, wherein the operations further comprise, associating the data value with a user identifier.

14. The computer-readable memory device of claim 10, wherein the electronic document is a web page, and the updated electronic document is an updated web page.

15. The computer-readable memory device of claim 9, wherein the electronic document comprises an input description associated with the variable.

16. The computer-readable memory device of claim 9, wherein the electronic document comprises an input description associated with another variable in the electronic document.

17. An apparatus, comprising:
a memory device configured to store instructions associated with an application program; and
a processing device that, in response to executing the instructions stored in the memory device, is configured to:
receive from a client device a request to place an order with a merchant;
requesting a data value from a wallet server in response to determining a communications proxy with the merchant;
receive an electronic document from a merchant server in response to forwarding the request to the merchant server, wherein the electronic document includes a variable;
make a determination that the data value conforms to a context in which the variable is used in the electronic document; and
substitute the data value for the variable in the electronic document in response to the determination.

18. The apparatus of claim 17, wherein the processing device is further configured to:
generate an updated electronic document after substituting the data value; and
transmit the updated electronic document to the client device in response to the request.

19. The apparatus of claim 17, wherein the processing device is further configured to:
store the data value in association with the context;
determine that a different variable in a different electronic document corresponds to the context; and
substitute the data value for the different variable based on the determining.

20. The apparatus of claim 17, wherein the processing device is further configured to store the data value via an Internet cookie.

21. The apparatus of claim 17, wherein the processing device is further configured to associate the data value with a user identifier.

22. The apparatus of claim 18, wherein the electronic document is a web page, and the updated electronic document is an updated web page.

23. The apparatus of claim 17, wherein the electronic document comprises an input description associated with the variable.

24. The apparatus of claim 17, wherein the electronic document comprises an input description associated with another variable in the electronic document.

* * * * *